(12) United States Patent
Parry

(10) Patent No.: US 10,690,375 B2
(45) Date of Patent: Jun. 23, 2020

(54) EXHAUST VENTILATOR

(71) Applicant: Ronald C Parry, Garden Bay (CA)

(72) Inventor: Ronald C Parry, Garden Bay (CA)

( * ) Notice: Subject to any disclaimer, the term of this patent is extended or adjusted under 35 U.S.C. 154(b) by 97 days.

(21) Appl. No.: 15/194,319

(22) Filed: Jun. 27, 2016

(65) Prior Publication Data

US 2017/0370610 A1    Dec. 28, 2017

(51) Int. Cl.
| | |
|---|---|
| *F24F 13/08* | (2006.01) |
| *B60H 1/26* | (2006.01) |
| *F24F 7/02* | (2006.01) |
| *B60H 1/30* | (2006.01) |
| *B63J 2/06* | (2006.01) |

(52) U.S. Cl.
CPC ............. *F24F 13/082* (2013.01); *B60H 1/26* (2013.01); *B60H 1/30* (2013.01); *F24F 7/02* (2013.01); *B63J 2/06* (2013.01)

(58) Field of Classification Search
CPC ....................................................... F23L 17/06
USPC ......................................................... 454/8, 32
See application file for complete search history.

(56) References Cited

U.S. PATENT DOCUMENTS

| | | | |
|---|---|---|---|
| 55,094 A | 5/1866 | Hardy | |
| 1,380,882 A * | 6/1921 | Brassington | F23L 17/06 454/32 |
| 1,637,265 A * | 7/1927 | Masson | F23L 17/06 454/22 |
| 3,302,552 A * | 2/1967 | Walsh | F23L 17/02 454/22 |
| 3,345,931 A | 10/1967 | Walsh | |
| 3,347,147 A | 10/1967 | Howard | |
| 3,382,792 A | 5/1968 | Howard | |
| 3,509,811 A | 5/1970 | Topp | |
| 3,874,363 A | 4/1975 | Biedenbender et al. | |
| 4,142,457 A | 3/1979 | Zaniewski | |
| 4,342,258 A | 8/1982 | Zaniewski | |
| 4,531,455 A | 7/1985 | Palmer | |
| 4,603,619 A | 8/1986 | Amphoux | |
| 7,001,266 B2 | 2/2006 | Jones et al. | |
| 8,298,053 B2 | 10/2012 | Parry | |

FOREIGN PATENT DOCUMENTS

| | | | | |
|---|---|---|---|---|
| CA | 2459368 A1 * | 9/2005 | ............... | F23L 17/06 |
| DE | 718472 C * | 3/1942 | ........... | B61D 27/009 |

OTHER PUBLICATIONS

DE718472MT, Machine Translation of Foreign Document From Espacenet (Year: 1942).*

* cited by examiner

*Primary Examiner* — Edelmira Bosques
*Assistant Examiner* — Elizabeth M. May
(74) *Attorney, Agent, or Firm* — Chernoff, Vilhauer, McClung & Stenzel, LLP

(57) ABSTRACT

A ventilator for exhausting gas from an exhaust port, by utilizing wind or relative wind around and through the ventilator to create a reduced pressure zone at an open exhaust port. Tapered intermediate portions extend from the opposite ends of a centrally located throat portion within a body of the ventilator to a pair of opposite mouths through which gas can flow out through the ventilator from the exhaust port. Each mouth of the ventilator has an opening with an area significantly larger than the area of a flow path within the throat portion. The throat portion may be of constant internal cross-sectional area over its entire length.

13 Claims, 19 Drawing Sheets

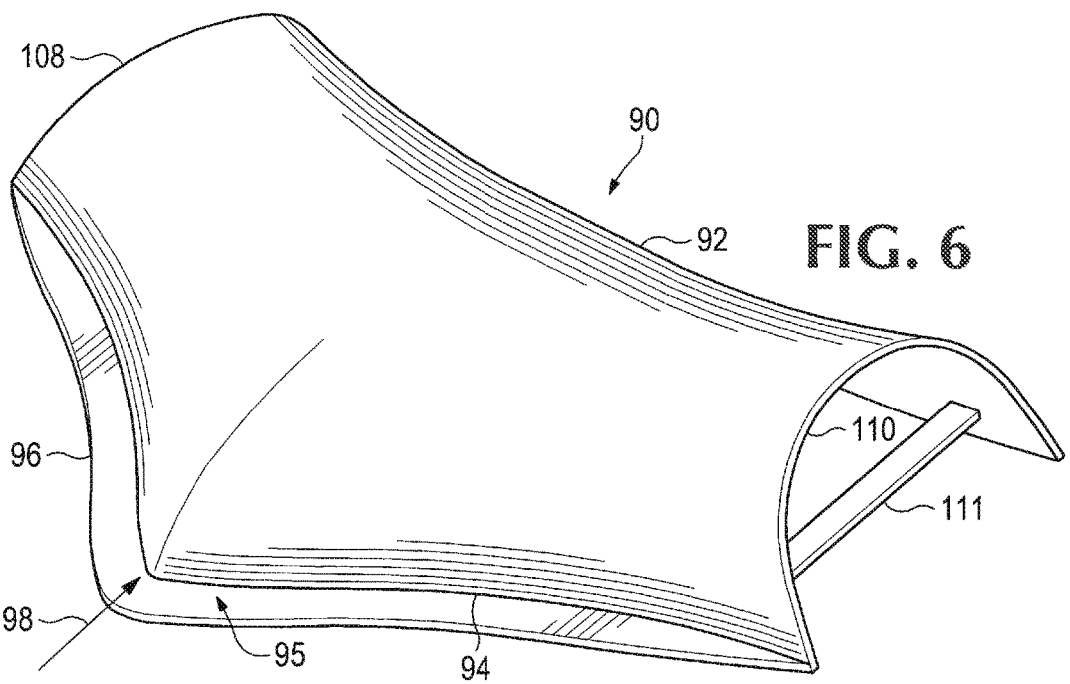
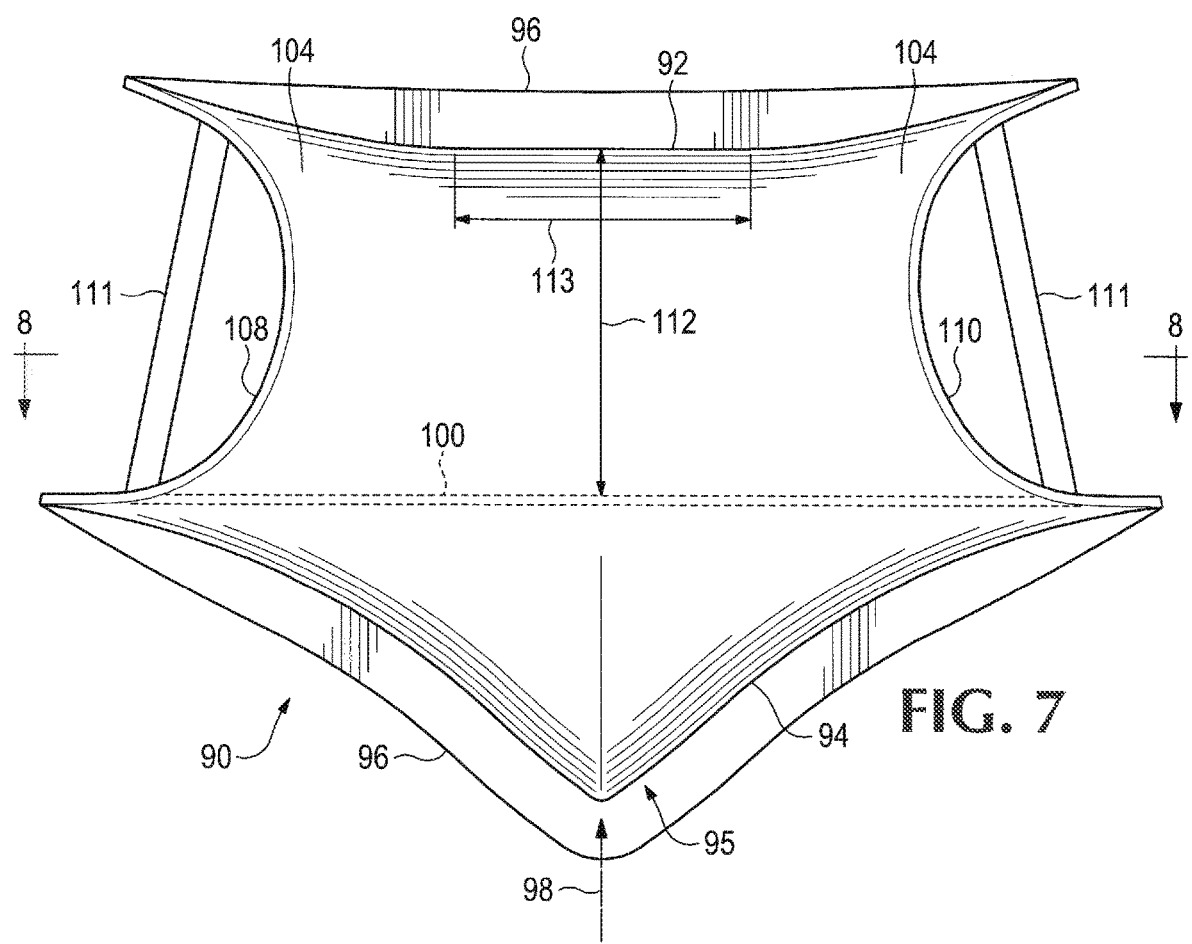

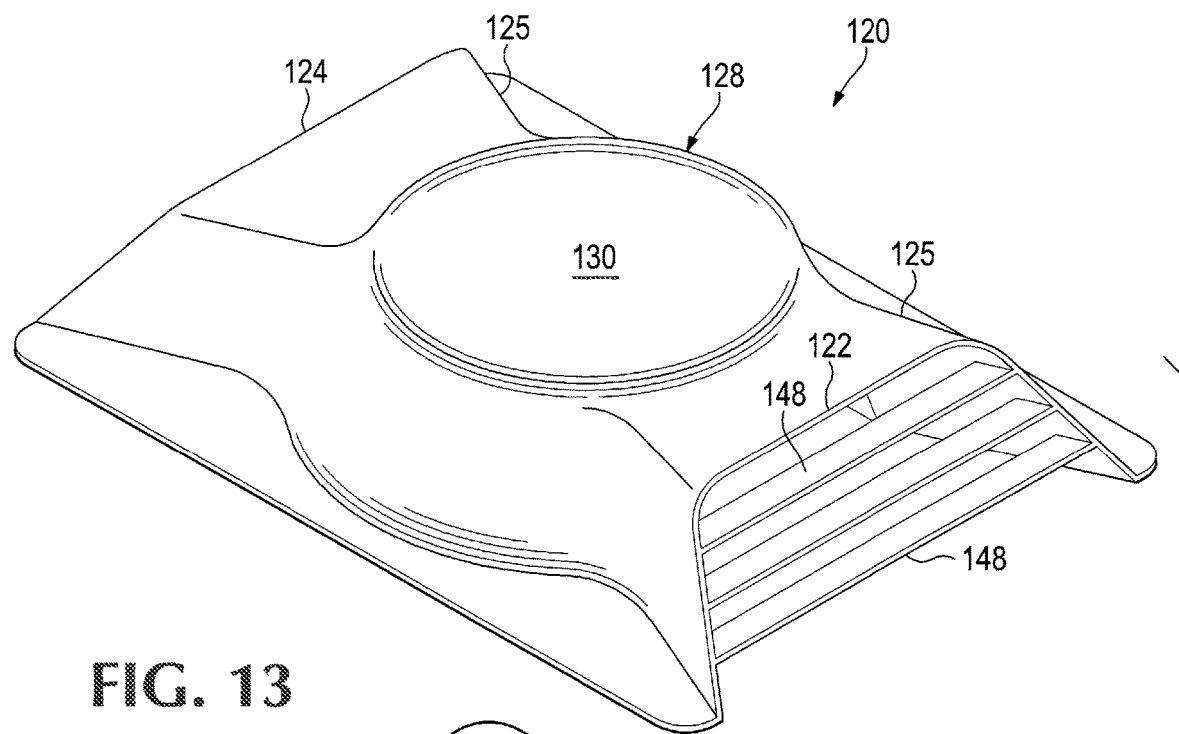
FIG. 13
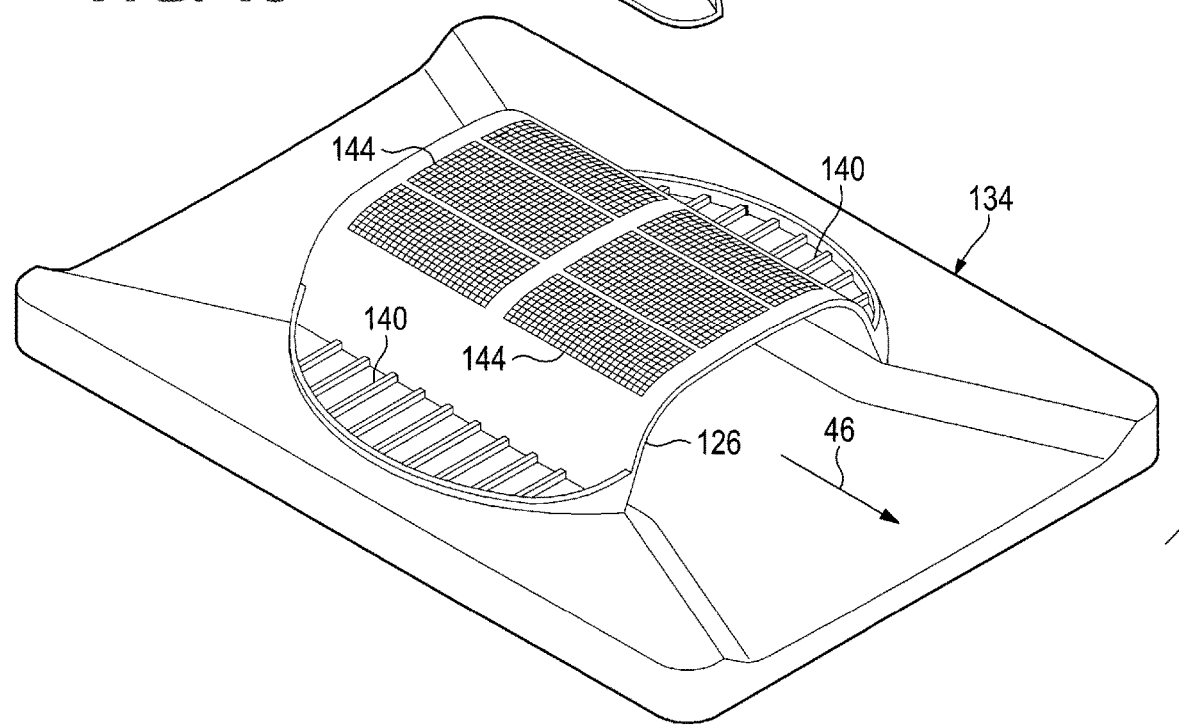

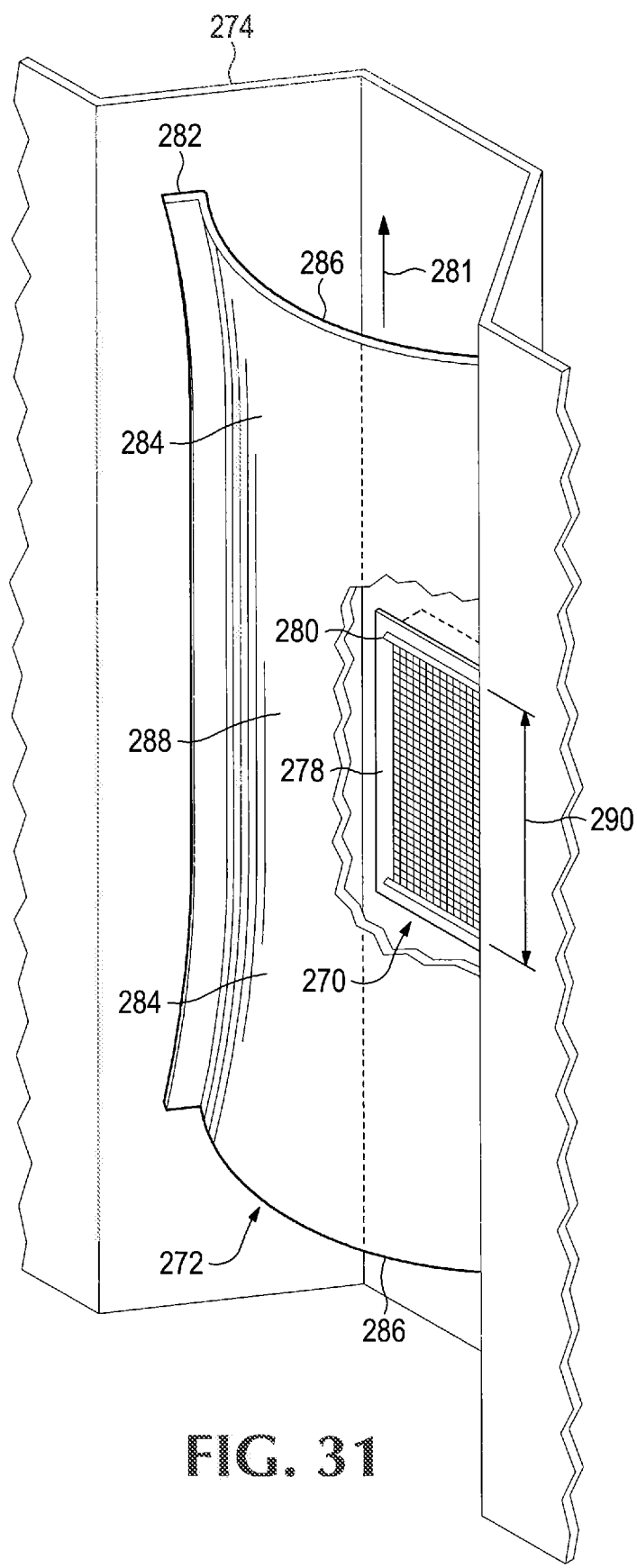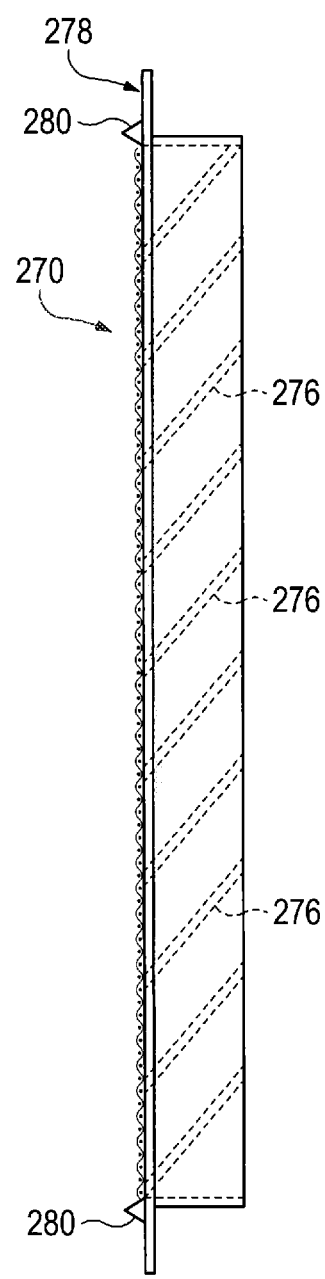
FIG. 31
FIG. 32

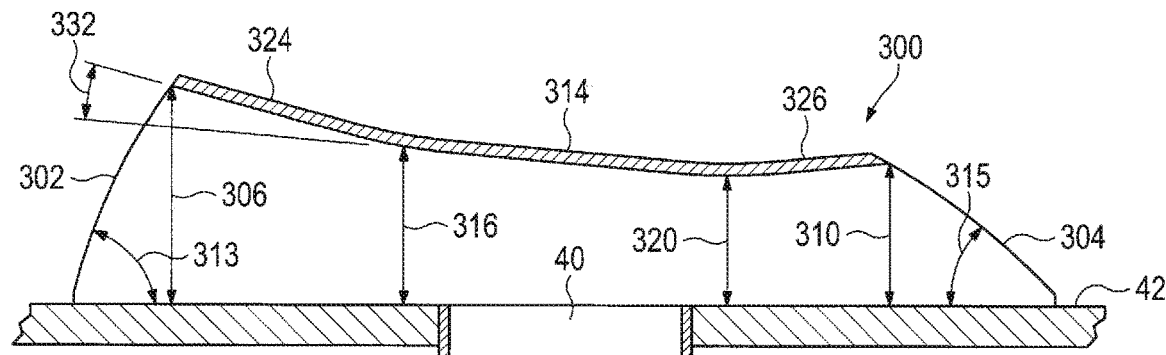
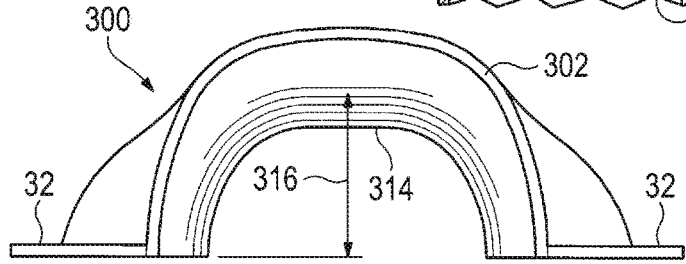
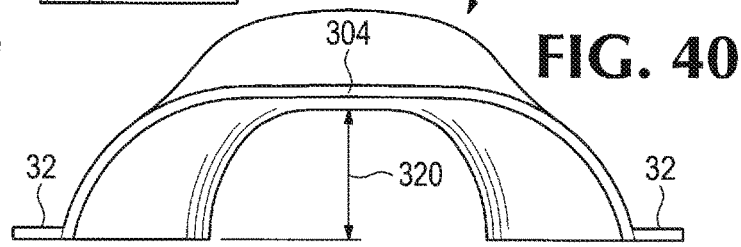
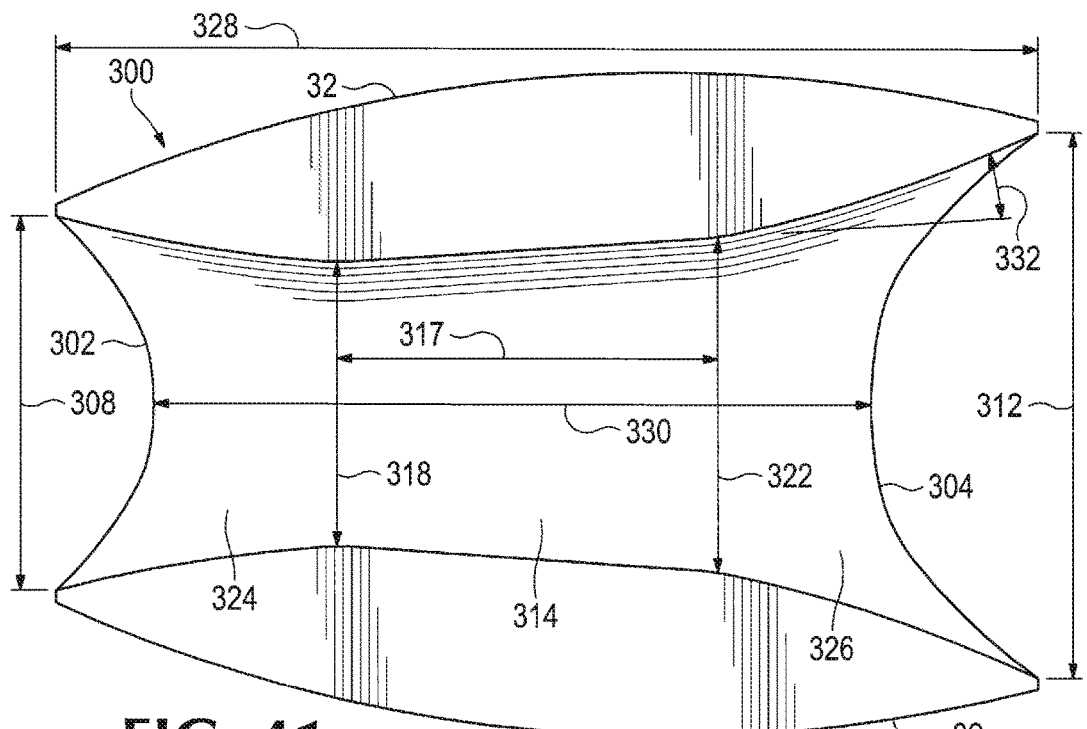

EXHAUST VENTILATOR

BACKGROUND OF THE INVENTION

The present application relates to ventilators for exhausting fumes, hot air, humid air, malodorous air, and the like from an enclosed space, and particularly relates to such ventilators passively utilizing wind to generate a reduced pressure zone within the ventilator and surrounding an exhaust port opening into the ventilator.

Vent conduits are often provided in boats, leading from an engine room or a sewage holding tank to a port located on a side of a boat hull. Also, it is desirable to prevent entry of water into a port yet to be able to exhaust fumes or stale air through the port from within the boat hull. Ventilation conduits may be provided similarly to allow stale or undesirably hot or humid air to escape from spaces within buildings or within truck cargo boxes, intermodal cargo containers, passenger automobiles, motorhomes or other recreational vehicles. It is desirable to be able to encourage such fumes or stale or otherwise undesirable air to be exhausted to the outside and to do so without having to utilize a powered fan or the like.

While a conduit can provide a path for exhausting air from an enclosed space, an opening at the outer end of the conduit, unless protected, can admit wind, rain, snow, and undesired airborne debris into a space intended to be ventilated, and so a ventilator is desired that can cover an opening such as a port at the end of an exhaust conduit, allowing gas to exhaust but discouraging flow back into the exhaust conduit.

In some applications it is important to protect an existing vent port or exhaust conduit port from exposure to wind, windborne debris, pollutants, rain, or other water. In other applications it is desirable to utilize the wind or relative wind to assist in exhausting air from an interior space from which a ventilation duct leads to a port opening through an exterior surface exposed to wind.

SUMMARY OF THE INVENTION

In order to meet the needs mentioned above, a ventilator is disclosed herein which can aid in creating flow from an exhaust vent or port to remove fumes, stale air, or the like from an enclosed space as a result of wind or relative wind flowing over and around the ventilator disclosed herein and defined by the claims which form a part of this disclosure.

In accordance with one aspect of the present disclosure, a ventilator includes a body constructed so as to prevent precipitation and airborne foreign material from entering into an exhaust port connected with a conduit leading from an interior space of a building, waterborne vessel, or vehicle.

In accordance with another aspect of the present disclosure, a ventilator includes a body constructed so as to cover an exhaust port and promote outward flow through an exhaust conduit and an exhaust port covered by the ventilator, without necessarily preventing precipitation or dust or other airborne foreign material from entering into the exhaust port.

An aspect of one embodiment of the ventilator disclosed herein is that it is adapted to be mounted on a generally flat surface to protectively surround an exhaust port connected with an exhaust conduit and opening through an exterior surface of a building, waterborne vessel, or vehicle.

One embodiment of the ventilator disclosed herein has a pair of mouths, each connected, through a tapered intermediate portion, to one of the opposite ends of a throat whose cross-sectional area is significantly smaller than an open area defined by the mouth, for example, one half the area defined by the mouth, and in such a ventilator the throat defines an opening arranged to receive a flow into the throat from an exhaust port with which the ventilator is associated.

Various embodiments of the ventilator disclosed herein may be particularly adapted for use in particular applications, as will be described in greater detail below.

It is a feature of one embodiment of the ventilator disclosed herein that it includes a bulkhead arranged to repel rain, snow, or other airborne particles and prevent their entry through the ventilator into an exhaust port with which the ventilator is associated, while the ventilator admits air to flow into and through the throat of the ventilator from one of the mouths, in such a manner as to produce a reduced pressure area within the throat of the ventilator and thus to induce flow from the exhaust port into the throat, through the ventilator, and out into the surrounding atmosphere.

As another aspect of a ventilator disclosed herein, a reduced pressure is developed within a throat portion of the ventilator as a result of wind or relative wind passing over the body of the ventilator and past the mouths of the ventilator.

As one further aspect of the disclosure herein, in one embodiment a vent port includes louvers and guide vanes that are arranged to reject inward flow of rain and other precipitation yet permit outward flow of gas from within a structure in which the vent port is mounted.

The foregoing and other objectives and features of the invention disclosed herein will be understood more fully with reference to the following detailed description and to the accompanying drawings which form a part of the disclosure herein.

BRIEF DESCRIPTION OF THE DRAWINGS

FIG. 6 is a perspective view of a ventilator which includes an embodiment of another aspect of the invention disclosed herein.

FIG. 7 is a top plan view of the ventilator shown in FIG. 6.

FIG. 13 is an exploded isometric view of the ventilator shown in FIGS. 11 and 12.

FIG. 31 is an isometric view showing a vent port which is a variation of the vent port shown in FIGS. 27-30, mounted together with a ventilator that is a variation of the ventilator shown in FIGS. 1-5, in a vertically oriented channel in a corrugated cargo container wall.

FIG. 32 is a right side elevational view of the vent port shown in FIG. 31.

FIG. 38 is a sectional view taken along line 38-38 of FIG. 37.

FIG. 39 is an end elevational view of the ventilator shown in FIGS. 36-38, as seen from the left end of FIG. 38.

FIG. 40 is an end elevational view of the ventilator shown in FIGS. 36-39, as seen from the right end of FIG. 38.

FIG. 41 is a bottom plan view of the ventilator shown in FIGS. 33-37.

DETAILED DESCRIPTION OF EMBODIMENTS

Figure 1:
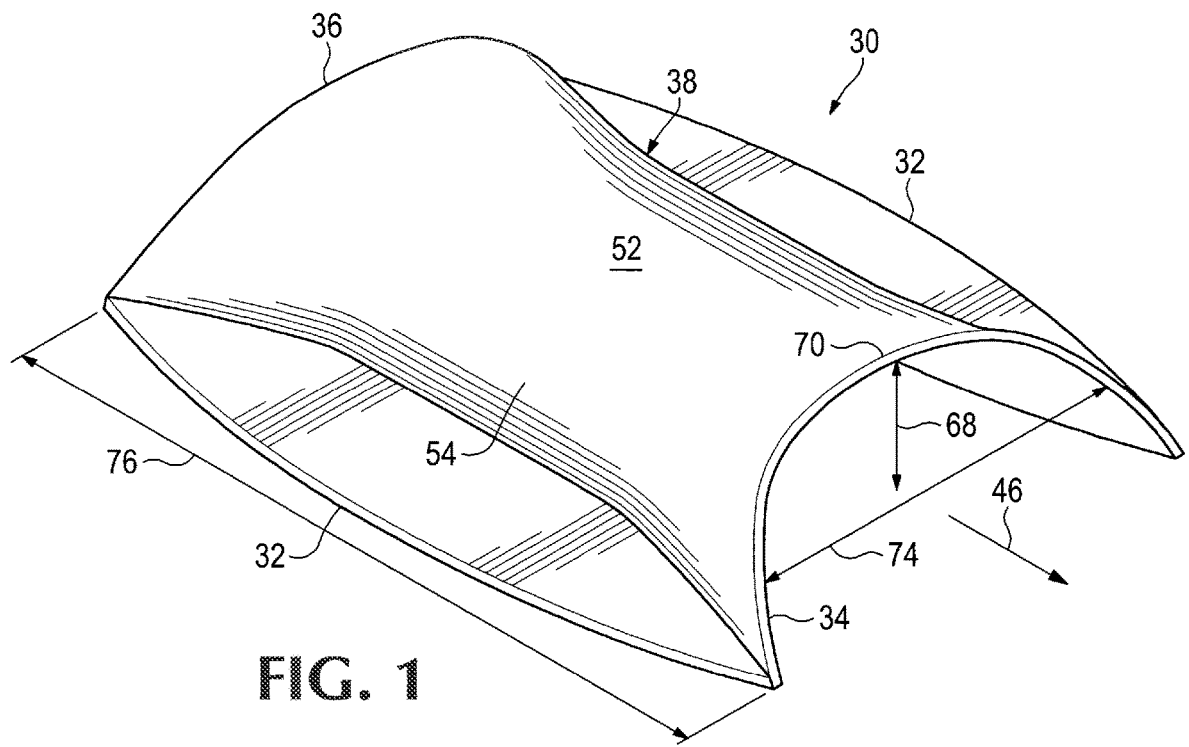
FIG. 1 is a perspective view of a passive ventilator which is a first embodiment of an aspect of the invention disclosed herein.
Figure 2:
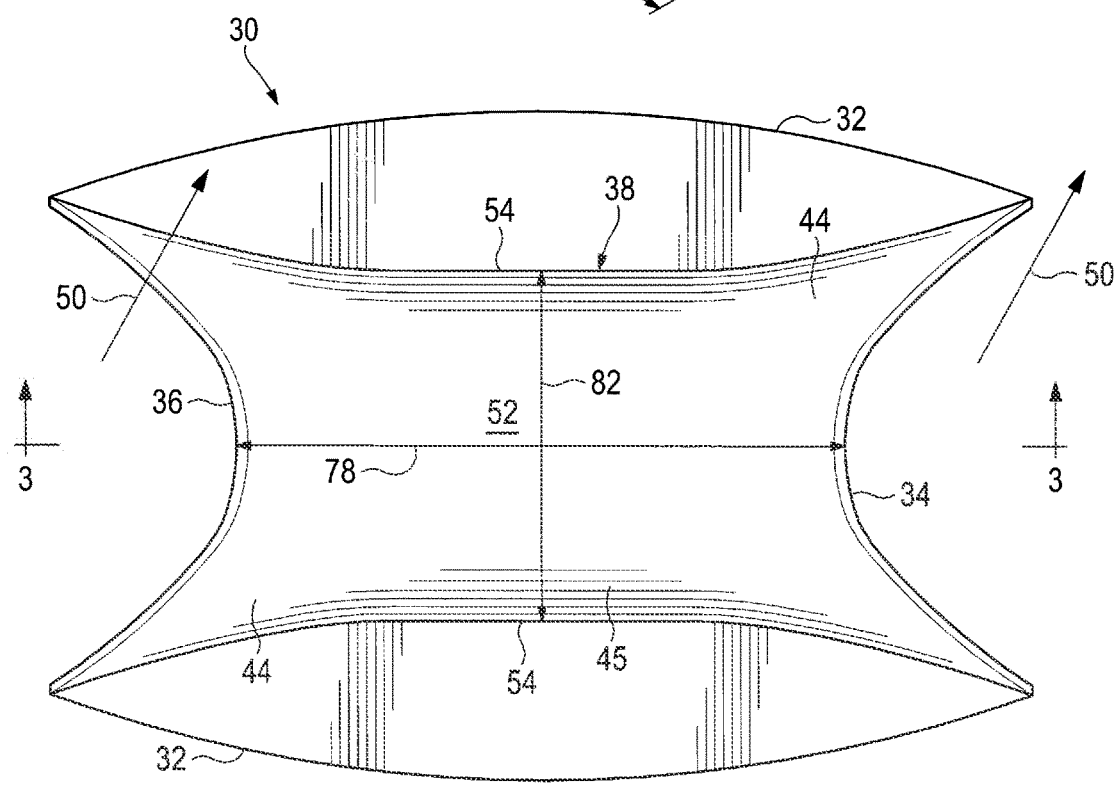
FIG. 2 is a top plan view of the ventilator shown in FIG. 1.

Referring now to the drawings which form a part of the disclosure herein, a ventilator 30 which is a first embodiment of the subject matter described herein is shown in FIGS. 1-5. The ventilator 30 has a respective base flange 32 on each of a pair of opposite sides and has a pair of open mouths 34 and 36 located respectively at opposite ends of a body 38. As shown best in FIGS. 2-5, the ventilator is substantially symmetrical about both a longitudinal axis and a transverse axis, so that both of the opposite ends including the pair of open mouths 34 and 36 are preferably substantially identical. The base flanges may cooperatively define a base plane 39. While they extend laterally away from the sides of the ventilator, the flanges 32 need not extend any particular distance from the sides of the ventilator, and they may assist in maintaining rigidity of the ventilator 30. In any case, they should be large enough in size to provide space to receive fasteners such as screws, or double-sided adhesive tape, to mount the ventilator 30 on an outer surface of a structure from whose interior the ventilator 30 is intended to assist in removing an exhaust flow of gas.

The ventilator 30 is utilized by mounting it over an opening such as exhaust port 40 that may be defined at an outer mounting surface 42 of a structure such as a boat, ship, building, or vehicle. The exhaust port 40 may, for example, be an open end of a vent pipe 43 communicating with an interior space in a boat, motor vehicle, or camper trailer or the like from which it is desired to remove fumes, undesirable odors, or undesirably humid, warm, or stale air, for example.

The body 38 may be constructed of a generally rigid yet tough material, such as plastics, sheet material of reinforced resin, or sheet metal, strong enough and rigid enough to withstand expected forces of wind, weather, and water, depending on where the ventilator is to be installed. The body 38 has an interior space that is tapered, in an intermediate portion 44 extending from each mouth 34 and 36, to a reduced internal size in a throat portion 45 that is not tapered, but has a constant cross-sectional area. As may be seen in FIGS. 2-5, the intermediate portions 44 are interconnected with and merge smoothly with the respective opposite ends of the throat portion 45. The interior space of the body defines a flow path 46 extending generally through the entire body, in which the cross-sectional area of the throat portion 45 is smaller than the open cross-sectional area of each mouth 34 and 36. The effective cross-sectional open areas of the mouths 34 and 36 are preferably equal and at least 1.5 times and preferably about 1.6-1.7 times as great as the cross-sectional area of the flow path 46 within the throat portion 45. The effective area of each mouth is, for the purposes of this disclosure, calculated by multiplying the maximum height 68 by the width 74 at mid-height, as shown in FIG. 1.

Airflow through the throat portion 45 and along the flow path 46 reduces the pressure within the throat portion 45 and thus promotes an exhaust flow into the throat portion 45 from the exhaust vent port 40, along a path 48 leading into the throat portion 45 to join a current flowing along the flow path 46. Depending upon the direction and intensity of wind relative to the ventilator 30, flow through the body 38 may involve wind entering through one open mouth 34 or 36 and exiting through the other open mouth 34 or 36 of the body 38 as indicated by the arrows 46. More commonly, wind or relative wind may pass by both of the mouths 34 and 36 in a generally oblique or transverse direction with respect to a longitudinal axis of the throat portion 45, as indicated by the arrow 50 in FIG. 2.

The top 52 and the two sidewalls 54 of the body 38 near the mouths 34 and 36 are tapered and angled laterally and upwardly outward in the intermediate portions 44 of the body, extending from the respective opposite ends 58 and 60 of the throat portion. Each of the intermediate portions 44 preferably has a smoothly faired and tapered shape to provide the previously mentioned larger area for flow at each open mouth 34 and 36. The tapered intermediate portions 44 may preferably be oriented at an angle 64 of between 15° and 23° with respect to the base plane 39 and the adjacent portions of the body defining the throat portion, as may be seen in FIGS. 3 and 5. The length 65 of the intermediate portions of the body should not be too small, yet the throat portion 45 may extend over as little as 30 percent to approximately 60 percent of the overall length 76 of the body 38. In any case, the length of the throat portion 45 must be greater than a maximum dimension of an exhaust port with which the ventilator is to be used.

Figure 3:
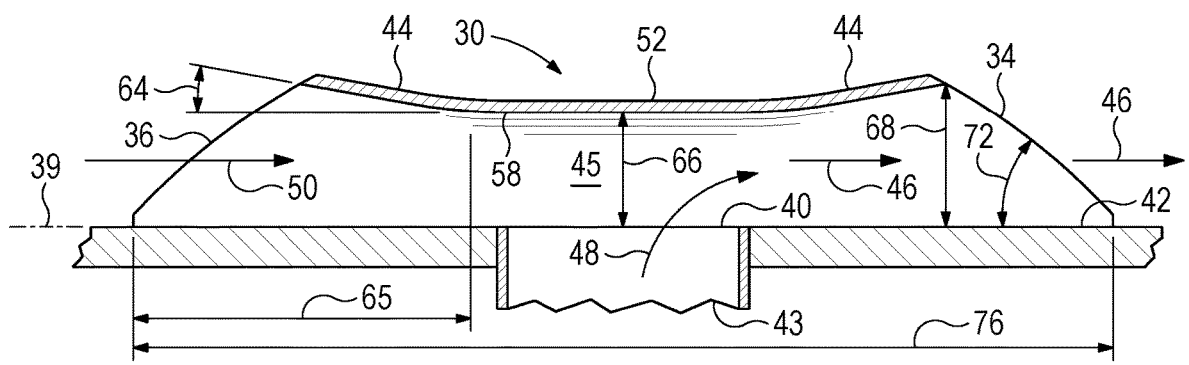
FIG. 3 is a sectional view of the ventilator, taken along line 3-3 in FIG. 2.
Figure 4:
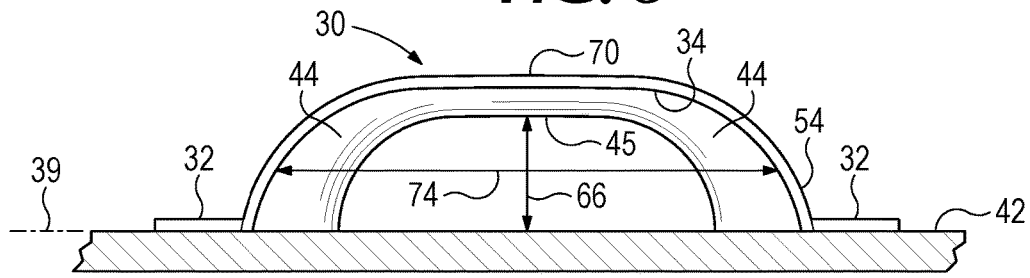
FIG. 4 is an end elevational view of the ventilator shown in FIGS. 1-3.
Figure 5:
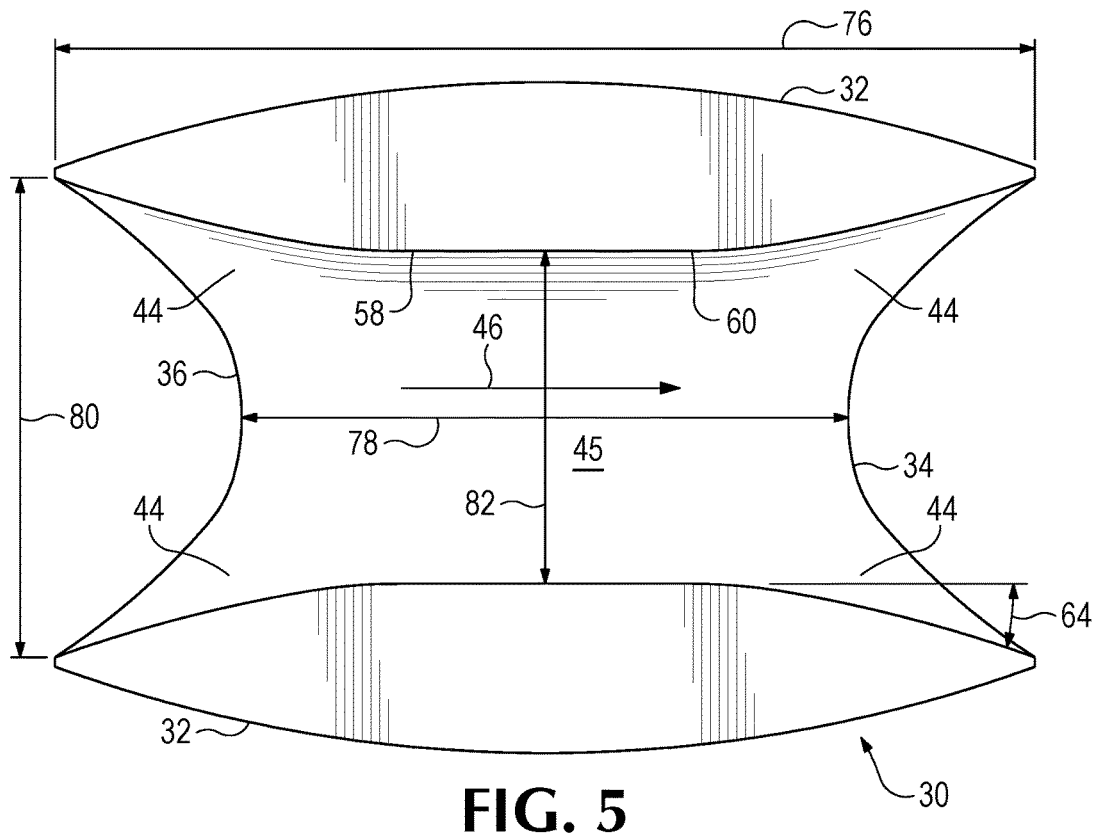
FIG. 5 is a bottom plan view of the ventilator shown in FIGS. 1-4.
Figure 8:
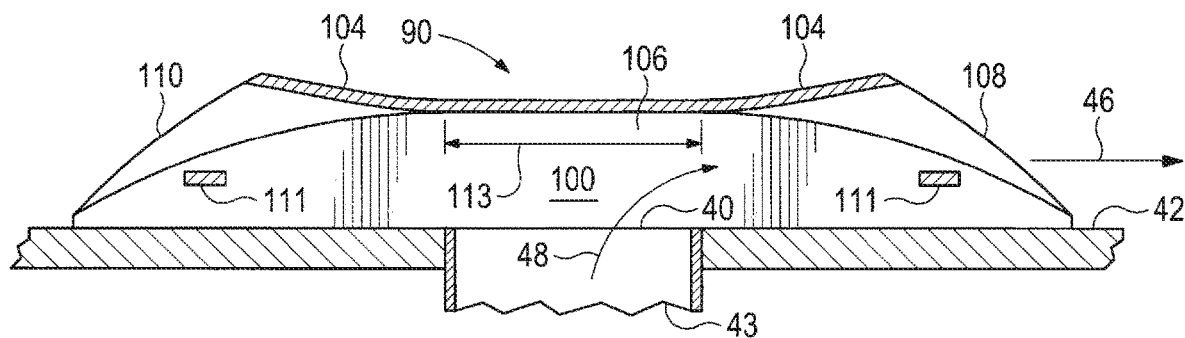
FIG. 8 is a sectional view of the ventilator shown in FIGS. 6 and 7, taken along line 8-8 in FIG. 7.
Figure 9:
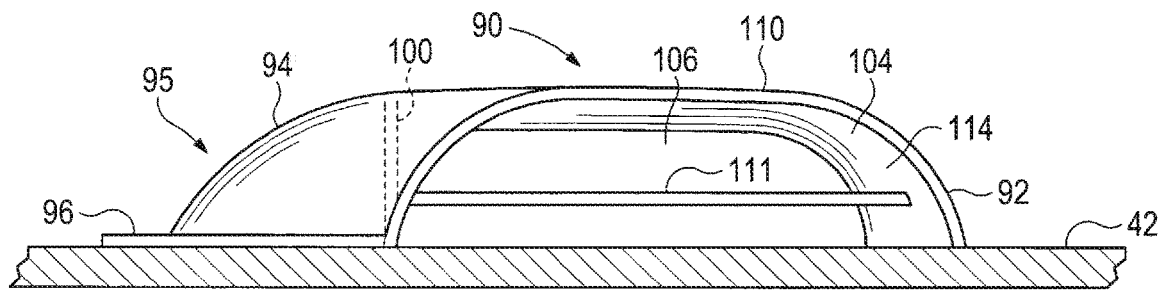
FIG. 9 is an elevational view taken from the right end of the ventilator as it is shown in FIG. 6.
Figure 10:
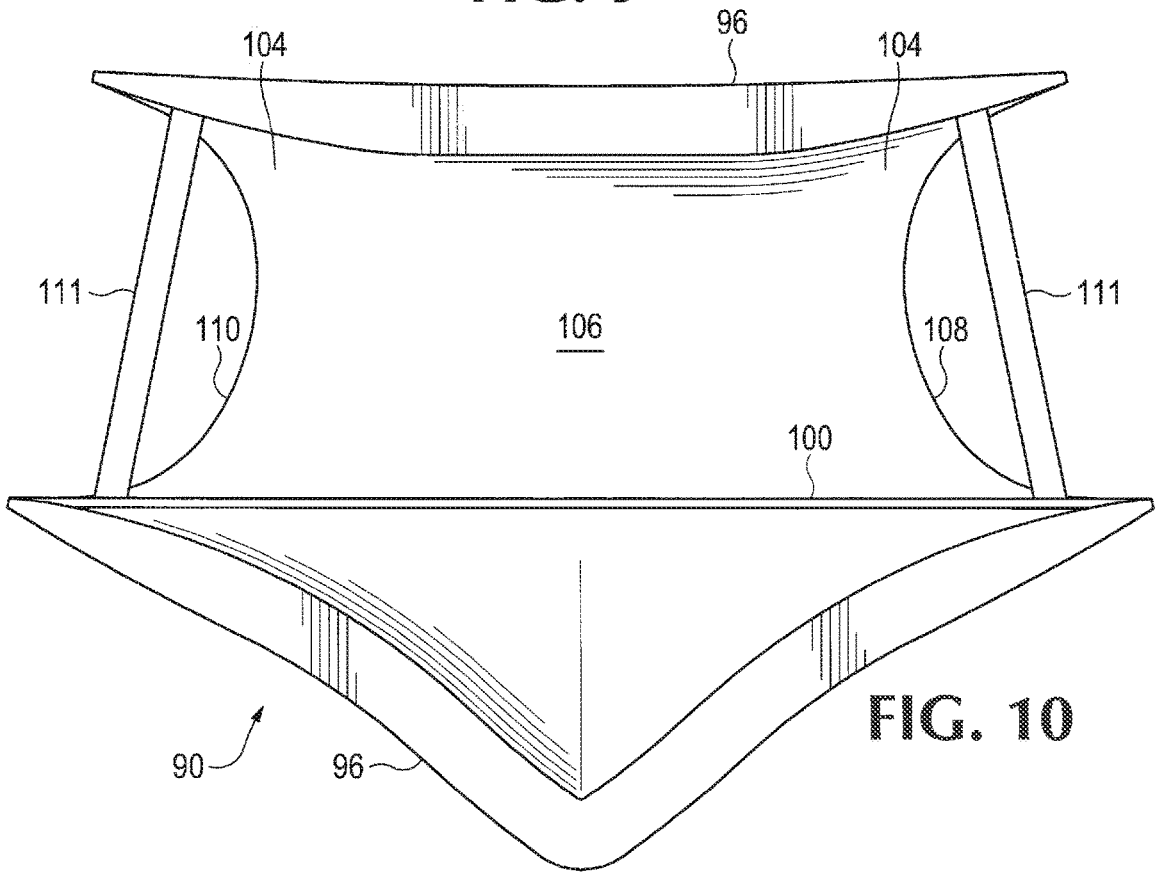
FIG. 10 is a bottom plan view of the ventilator shown in FIGS. 6-9.
Figure 11:
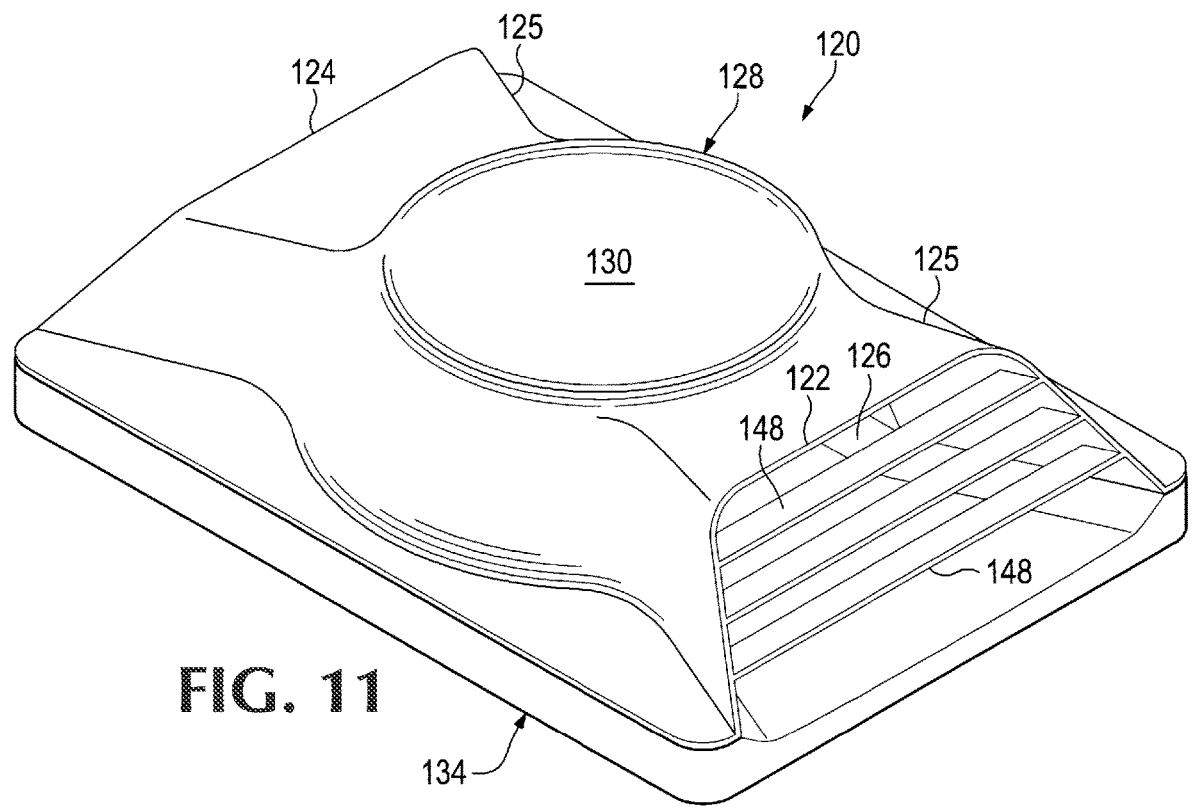
FIG. 11 is an isometric view of a high volume ventilator adapted for mounting atop a horizontal roof so as to protect an exhaust port opening through the roof.

As may be seen best in FIG. 3, the body 38 may have a height 66 within the throat, and a greater maximum height 68, in a laterally central portion 70 of each mouth 34 or 36, that may be as much as about one third greater than the height 66. The margins of the side walls of the body are angled from their bottom corners, near the surface 42, toward the centrally located upper edge 70 of each mouth 34 and 36, at an angle 72 which may be in the range of 25° to 65° with respect to the horizontal base. The body 38 has an overall maximum length 76 adjacent the mounting surface 42 which may be selected to correspond with the size of the exhaust port 40 with which the exhaust ventilator 30 is to be utilized. Because of the angle 72, the minor length 78 of the body at the highest, laterally centrally located points 70 of the mouths 34 and 36 is accordingly shorter than the overall maximum length 76 by a distance in the range of about 35% to 50% of the overall maximum length 76. The minor length 78 should, however, be at least about 40 percent greater than the width 82 of the throat portion.

The maximum width 80 of each mouth 34 and 36 may be about 40% to 50% of the overall length 76, and the width 82 of the throat portion 45 may be in the range of 74% to 88% of the width 80 of the mouths 34 and 36.

As shown in FIGS. 6-10, a ventilator 90 may have a rear side 92 similar to one side 54 of the ventilator 30 shown in FIGS. 1-5, and may have a front side 94 including a convex forward projection 95 that may resemble the bow of a boat. Base flanges 96 are provided as in the ventilator 30, for mounting the ventilator 90 to a surface. When the ventilator 90 is mounted for use the front side 94, including the convex forward projection 95, should face in the direction of travel of a vessel or vehicle on which the ventilator 90 is mounted.

An upright interior wall 100 extends within the outer body shell 102 of the ventilator 90, from the interior surface of the ventilator shell 102 to the base plane, isolating the forward projection 95 from the flow path 46 through the interior of the ventilator 90. As a result the cross-sectional area of the throat portion 106 of the ventilator 90 is smaller than the effective cross-sectional area of either of the mouths 108 and 110. A slat 111 may extend across each mouth 108 and 110 to help exclude airborne debris such as tree leaves and also to help guide the flow of air smoothly into or out from the mouths. The interior wall 100 may be generally planar, as shown in FIGS. 6-10, and the opposite rear side 92 of the ventilator 90 is appropriately shaped to provide the tapered intermediate portions 104 of the ventilator 90 and establish a sufficiently reduced width 112 of the throat portion 106 of the ventilator 90 to result in the desired Venturi effect. The interior of the body of the ventilator is preferably shaped as in the ventilator 30 to include outwardly spreading intermediate portions 104 between the respective opposite ends of the throat portion 106 and each of mouths 108 and 110. Flow paths 46 and 48 are thus available for flow of air through the ventilator and from an exhaust port 40 into the throat portion 106 of the ventilator 90 and are similar to those of the ventilator 30 described above and shown in FIGS. 1-5. As in the ventilator 30, the mouths 108 and 110 should be equal in open cross-sectional area, and the cross-sectional area within the throat portion 106 should be less than the open cross-sectional area of each mouth and should be constant throughout the length 113 of the throat portion 106.

Another embodiment, a ventilator 120, intended to function best as a rooftop-mounted ventilator, has a pair of opposite open mouths 122 and 124 and a shape tapered from a larger effective cross-sectional open area of each mouth 122 or 124 to a smaller cross-sectional area within a throat portion 126, as shown in FIGS. 11-15. As may be seen, the ventilator 120 has an upper or outer shell member 128 which defines upper portions of the open mouths 122, 124 and intermediate portions 125, between the open mouths and the throat portion 126. The shapes of the mouths 122, 124, and the intermediate sections 125 may be similar to corresponding portions of the ventilator 30 shown in FIGS. 1-5. The upper shell member 128 has a wide middle portion 130 that has a greater width and a greater height than the throat portion 126, defining interior space 132 alongside the throat portion and space 136 above the throat portion 126 of the base portion 134. The middle portion 130 of the upper shell member 128 thus defines and includes conduits 138 leading upward from the base portion 134 along each side of the throat portion 126 and leading to the space 136 above the throat portion 126 of the ventilator 120.

A bottom face of the base portion 134 may be configured as required so that the ventilator may easily be mounted upon a surface through which a vent port 40 is defined. An exhaust conduit 43 may extend into the vent port 40 from the interior of a structure such as a motorhome or trailer or mobile home. The base portion 134 provides protection of the vent port 40 against the elements. The base portion 134 also defines lower portions of the internal conduits 138 leading from the vent port 40 covered by the base portion 134 through the sides of the wide middle portions 130 of the upper shell 128, around the throat portion 126 of the ventilator 120. A grating of narrow bars 140 may extend across the internal conduits from the upper or outer shell to the throat portion to provide rigidity and structural support for the throat portion, yet leave ample open space for flow through the conduits.

The throat portion 126 is included in the base portion 134, as may best be seen in FIG. 13. The upper shell member 128 includes portions of the mouths 122 and 124 and intermediate portions 125 of the ventilator 120 and mates with the base portion 134 to define a flow path 46 similar to the flow path 46 of the exhaust ventilators described previously and shown in FIGS. 1-10. The intermediate portions 125 of the flow path to the throat portion 126 are defined by the shape of the sheet material of the upper shell portion 128, extending inward from the mouths 122 and 124, as shown in FIGS. 11-14. The intermediate portions 125 thus define the same sort of tapered flow path 46 from the mouths 122 and 124 as is included in the ventilator 30 shown in FIGS. 1-5.

The conduits 138 lead from a vent port beneath the base to a permeable area 144 defined by a screen or an area of perforations which may be located in the upper part of the throat portion 126, as shown, or which might be provided in the side walls of the throat portion 126. Air to be exhausted from the exhaust conduit 43 via the vent port 40 from a space beneath the base portion 134 can pass from the vent port 40 into the throat portion 126 of the ventilator through the screen or perforations, seeking to flow to a reduced pressure area within the throat portion 126 resulting from the Venturi effect of air flowing through the throat portion at a higher speed, because of the smaller cross-sectional area of the throat portion 126 as compared with the mouths.

Figure 12:
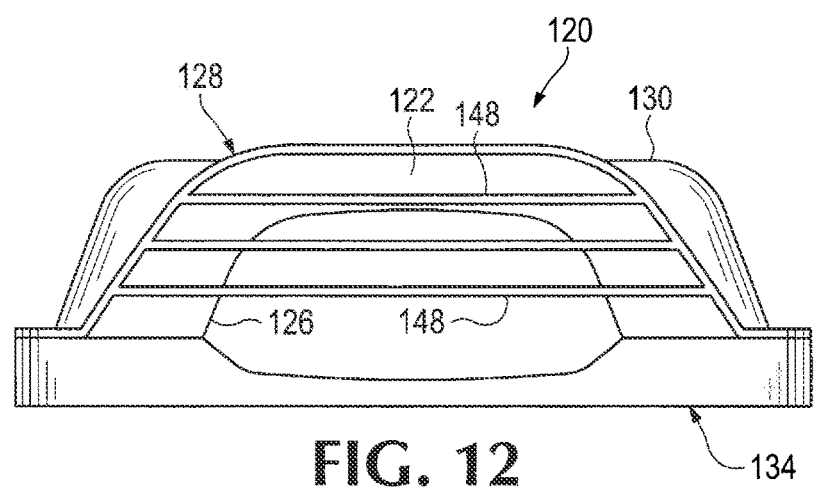
FIG. 12 is an end elevational view of the ventilator shown in FIG. 11.
Figure 14:
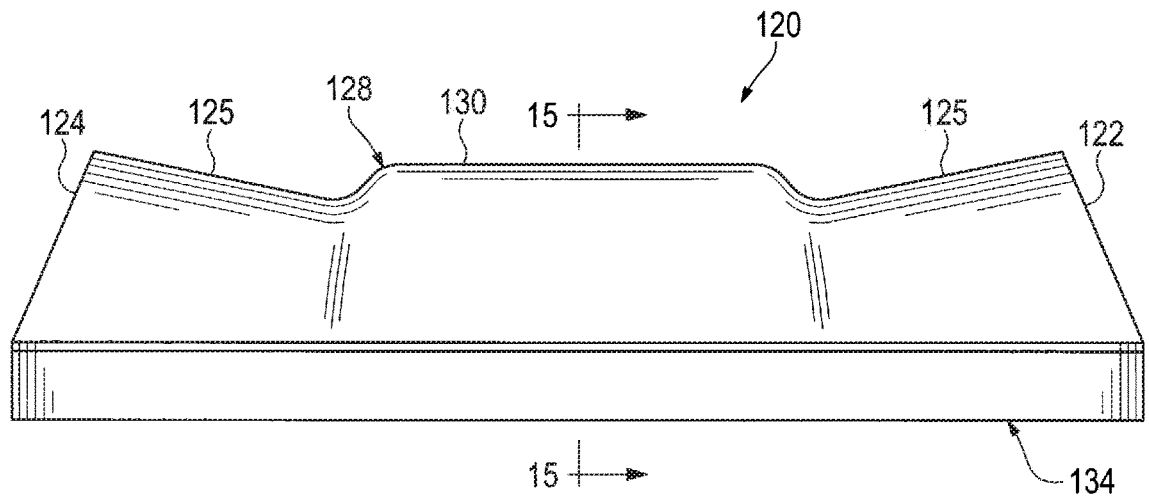
FIG. 14 is a side elevational view of the ventilator shown in FIGS. 11-13.
Figure 15:
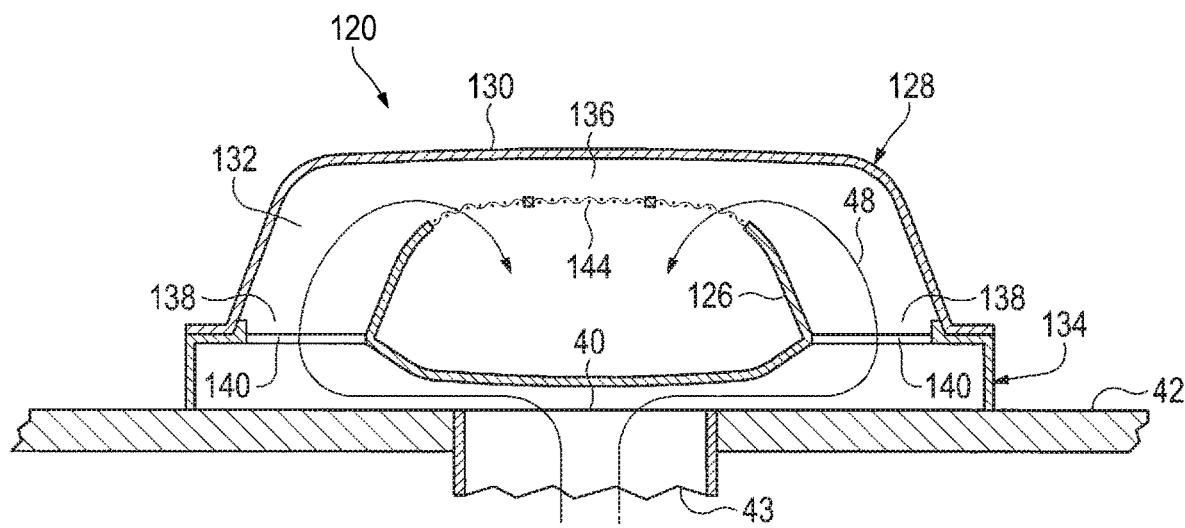
FIG. 15 is a sectional view taken along line 15-15 in FIG. 14, showing the ventilator shown in FIGS. 11-14 mounted above an exhaust vent port.
Figure 16:
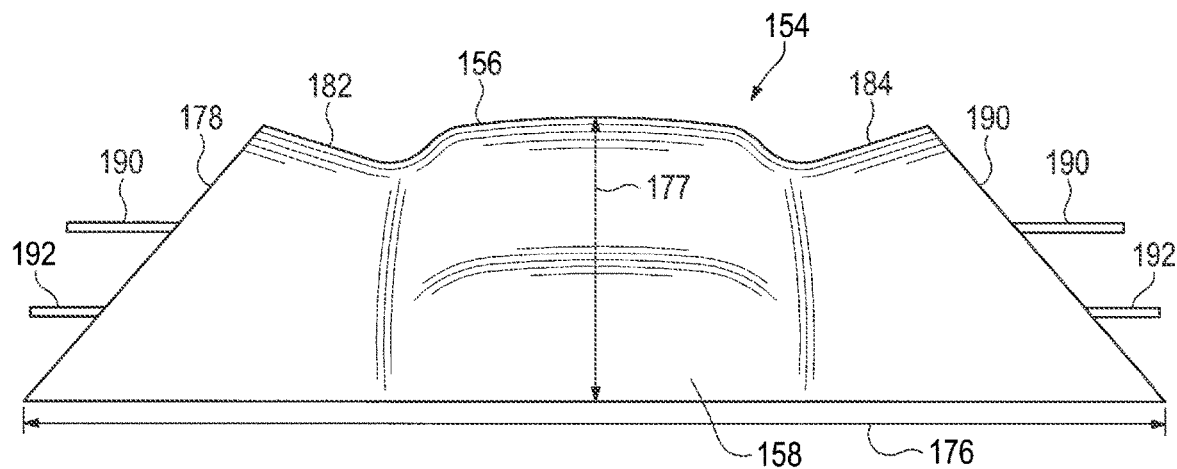
FIG. 16 is a front end elevational view of a ventilator which is an embodiment of another aspect of the invention disclosed herein.
Figure 17:
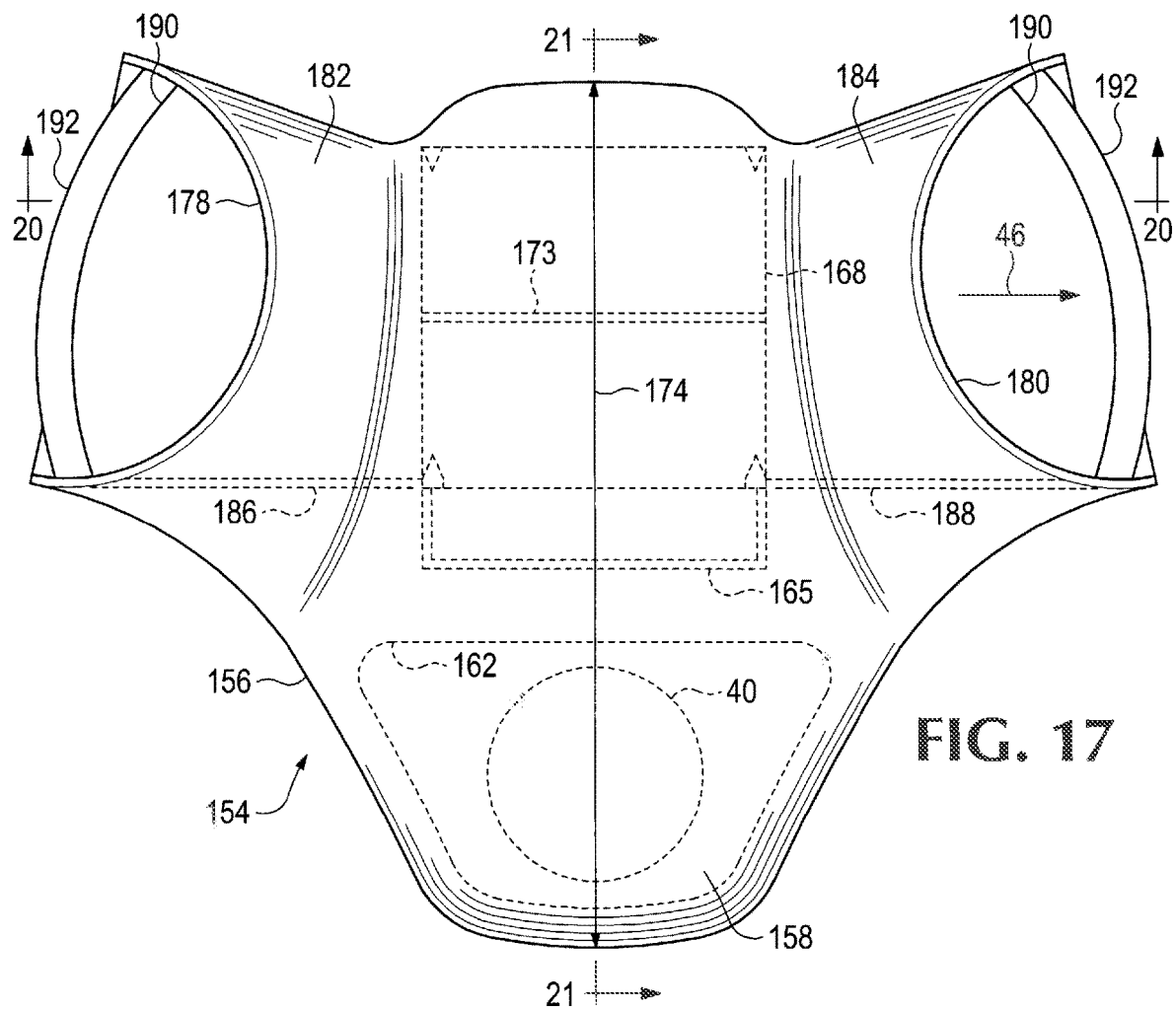
FIG. 17 is a top plan view of the ventilator shown in FIG. 16.

Slats 148 may be provided in each of the mouths 122, 124 of the exhaust ventilator 120, as may be seen in FIGS. 12 and 14. The slats 148 may extend horizontally across the mouths 122, 124, as shown in FIG. 12 to intercept rain and prevent it from splashing up to the screen 144. The slats 148, if present, are preferably oriented to direct the flow 46 of air into or out from within the outer shell 128 of the ventilator 120 with a minimum of impedance, and thus may assist in guiding the exhaust flow of air outward through the mouths 122 and 124, from the throat portion 126 of the ventilator 120.

A ventilator 154 shown in FIGS. 16-21 is also intended as a rooftop mounted device, to be utilized for assisting an exhaust flow from a vent port 40 in a structure where the ventilator 154 may be exposed to rain, spray from a body of water, or other airborne materials preferably to be excluded from the space from which air is intended to be exhausted. The ventilator includes an outer shell 156 of thin rugged sheet material providing an exterior shape of which a dome-like or bulbous front portion 158 of the ventilator 154, like the forward projection 95 of the ventilator 90, is intended to be oriented into the wind or relative wind, as by being directed toward the front of a vehicle on whose roof the ventilator 154 may be mounted. The front portion 158 may extend upward above a base sheet 160, best seen in FIG. 18, that may be flat or shaped to fit the contours of a location where the ventilator 158 is intended to be mounted.

There is an exhaust inlet opening 162 through the base sheet 160, within the front portion 158, through which the opening of a vent port 40 may communicate with the interior of the ventilator 154 to receive a flow of air or the like from a space intended to be ventilated by the ventilator 154. In order to prevent rain or other airborne material from outside the ventilator being carried downward into the vent port, there is a bulkhead 164 extending upward from the base sheet 160 toward the interior surface of the outer shell 156 of the ventilator 154, which may be somewhat similar in shape to the upper portion of the ventilator shown in FIGS. 6-10.

A top margin 165 of the bulkhead 164 is spaced downwardly apart from the interior surface of the outer shell 156, and there is an open space 166 above the top margin 165 of the bulkhead 164 as part of an exhaust passage conduit, so that air flowing into the interior space defined by the outer shell 156 of the ventilator 154 through the exhaust inlet opening 162 in the base plate 160 can flow over the top margin 165 of the bulkhead 164 within the outer shell 156 along flow paths 169 and into the throat portion 168 of the ventilator, through areas 170 and 172 of perforations or screen material forming portions of the side walls of the throat portion 168. The screen material or perforated portions 170 and 172 of the throat portion 168 should define the desired internal shape and cross-sectional area of the throat portion 168. The perforations or openings through screen material should be small enough so that air flowing along the interior of the throat along a flow path indicated by an arrow 46 will generally be guided by the shape of the throat portion 168 as defined by the inner surface of the screen material. On the other hand, the perforations should be large enough to permit a flow of a reasonable volume of air, received from a vent port 40 beneath the base sheet 160, to flow into the throat portion 168 through the perforations.

For example, a ventilator 154 having a width 176 of 17 inches from mouth 178 to mouth 180 and an overall length 174 of 16 inches and a height 177 of 5 inches may be mounted over a vent port 40 having an area of 50 square inches. In such a ventilator 154 areas of screen material about 6 inches by 3 inches may be provided on each of the front and rear generally upright perforated portions 170 and 172 of respective walls of the throat portion 168, as may be seen in FIGS. 20 and 21. Air may thus flow into the ventilator 154 from a vent port 40 beneath the exhaust inlet opening 162 in the base sheet 160 in the front portion of the ventilator 154 and thence above and over the bulkhead 164 through the space 166 in the exhaust passage conduit defined by the upper part of the outer shell 156. It can then flow down and through the screen material or perforations 170 and 172 into the interior of the throat portion 168, as shown best by the arrows 169 in FIG. 21. Screen material having about 200-400 holes per inch, each hole having a largest dimension of about 0.04-0.06 inch, would be satisfactory. An upright center divider wall 173 may be provided in the throat portion 162, extending from end to end of the throat portion 168 to smooth the flow through the throat portion 168 and prevent different flows through the screens 170 and 172 from causing buffeting.

Figure 18:
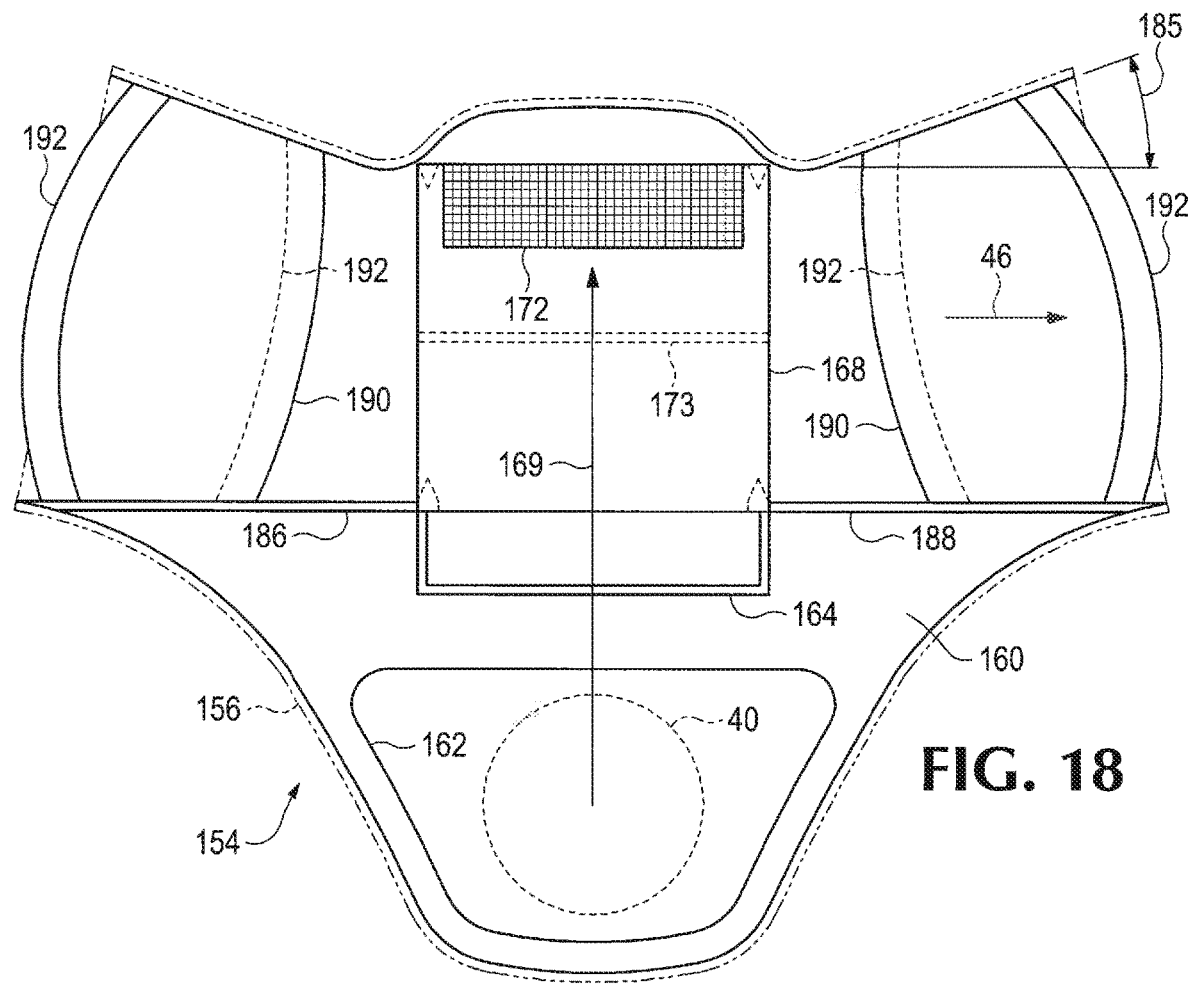
FIG. 18 is a top plan view of interior components of the ventilator shown in FIGS. 16 and 17.
Figure 19:
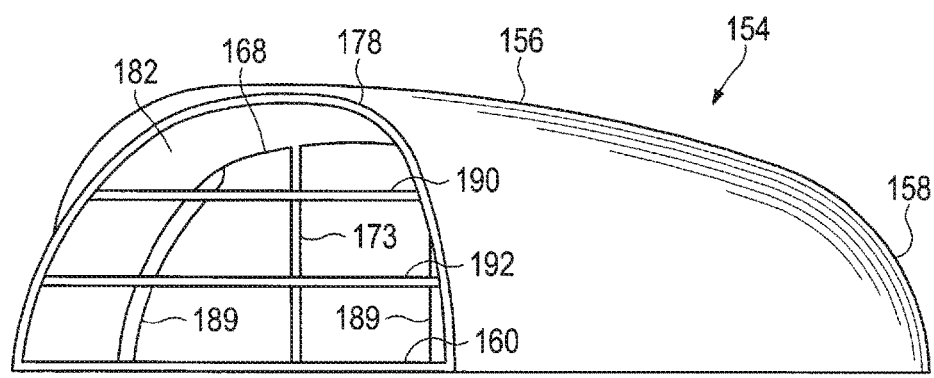
FIG. 19 is a side elevational view of the ventilator shown in FIGS. 17-19.
Figure 20:
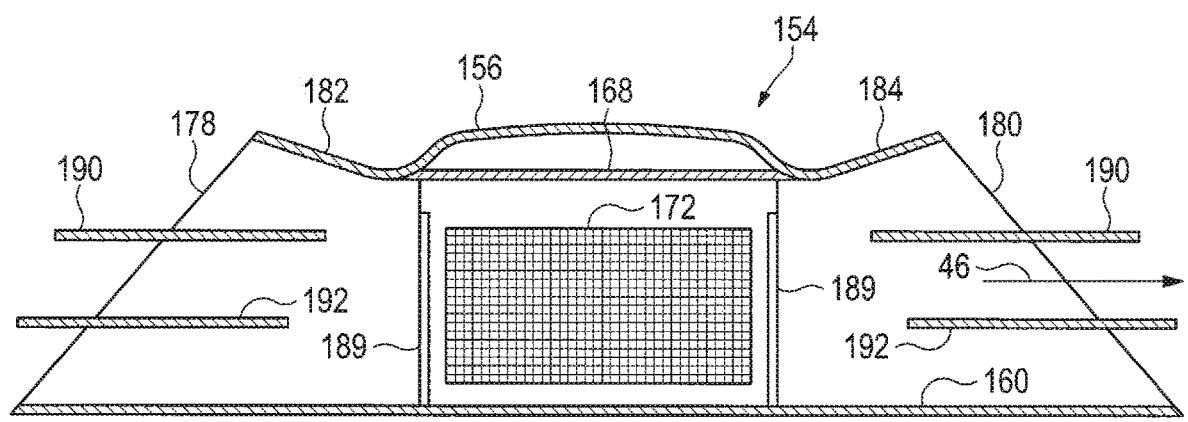
FIG. 20 is a sectional view taken along the line 20-20 in FIG. 17.
Figure 21:
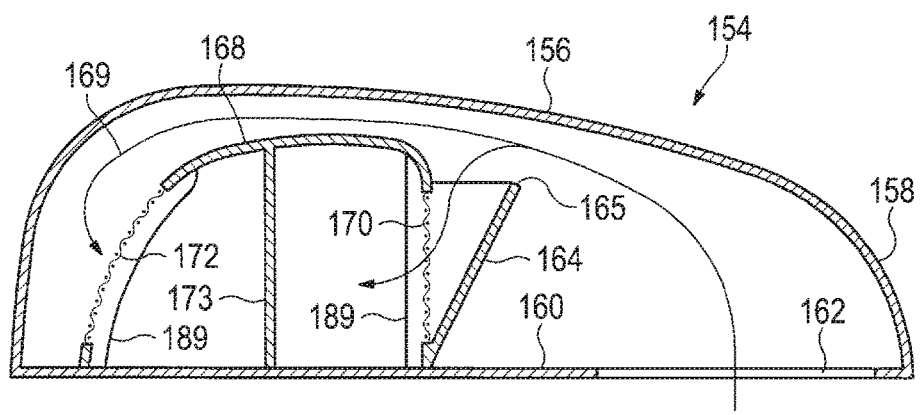
FIG. 21 is a sectional view taken along line 21-21 in FIG. 17.
Figure 22:
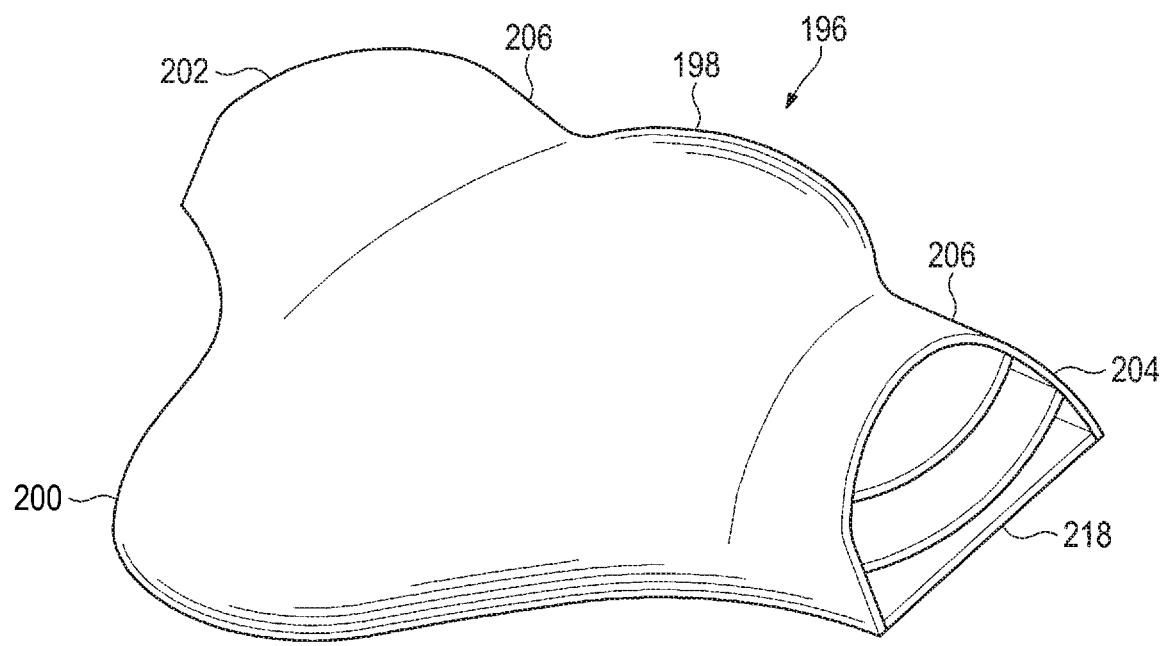
FIG. 22 is an isometric view taken from ahead of and above a low profile passive ventilator that is another embodiment of the ventilator disclosed herein.
Figure 23:
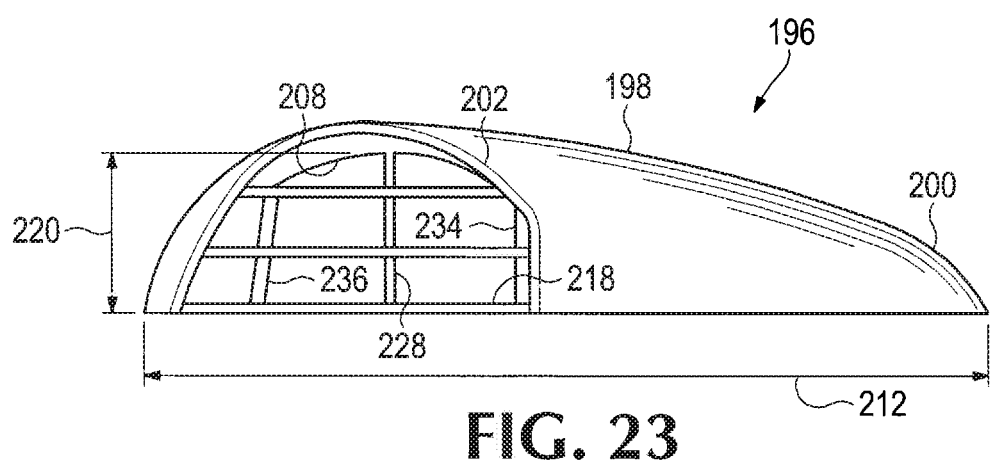
FIG. 23 is a left side elevational view of the ventilator shown in FIG. 22.
Figure 24:
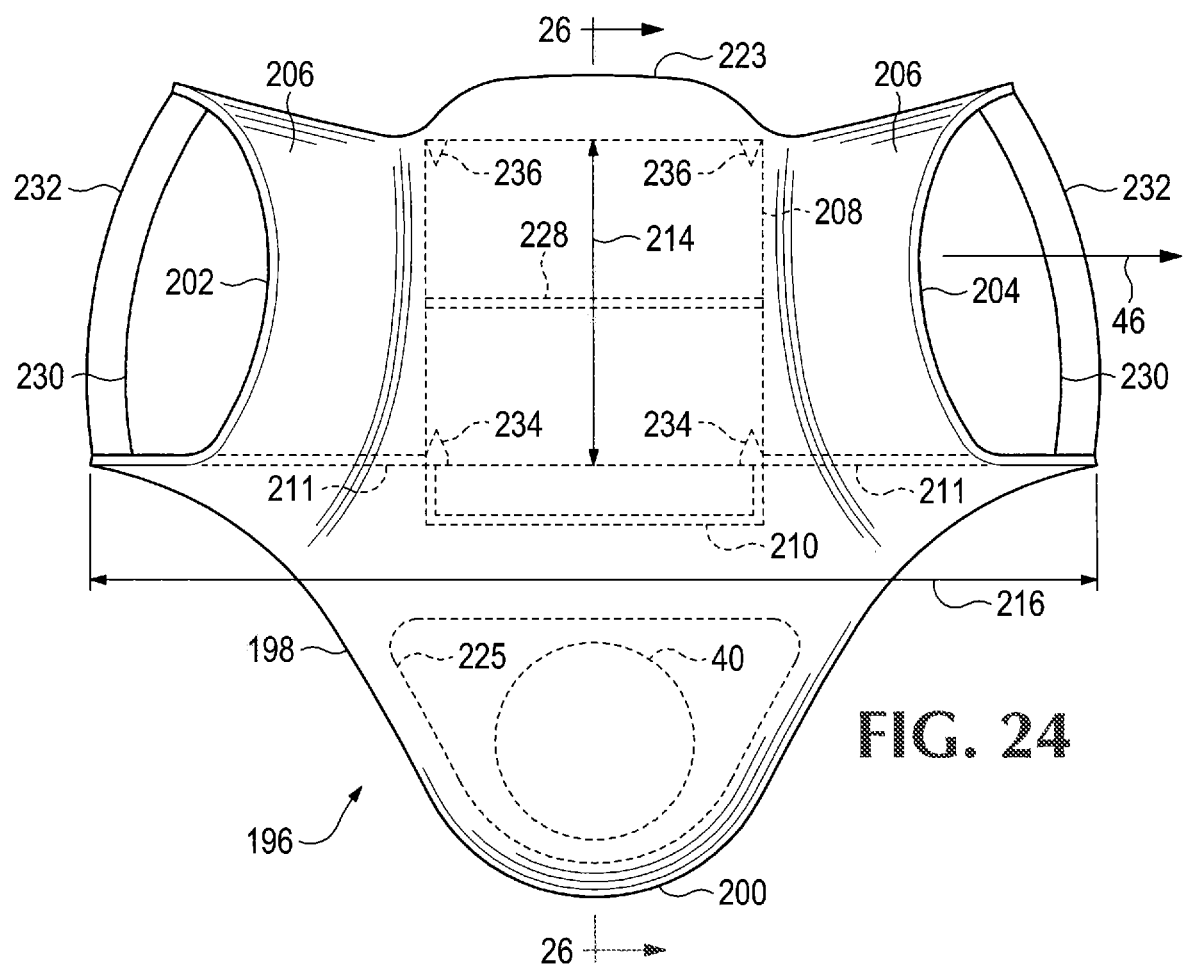
FIG. 24 is a top plan view of the ventilator shown in FIGS. 22 and 23.
Figure 25:
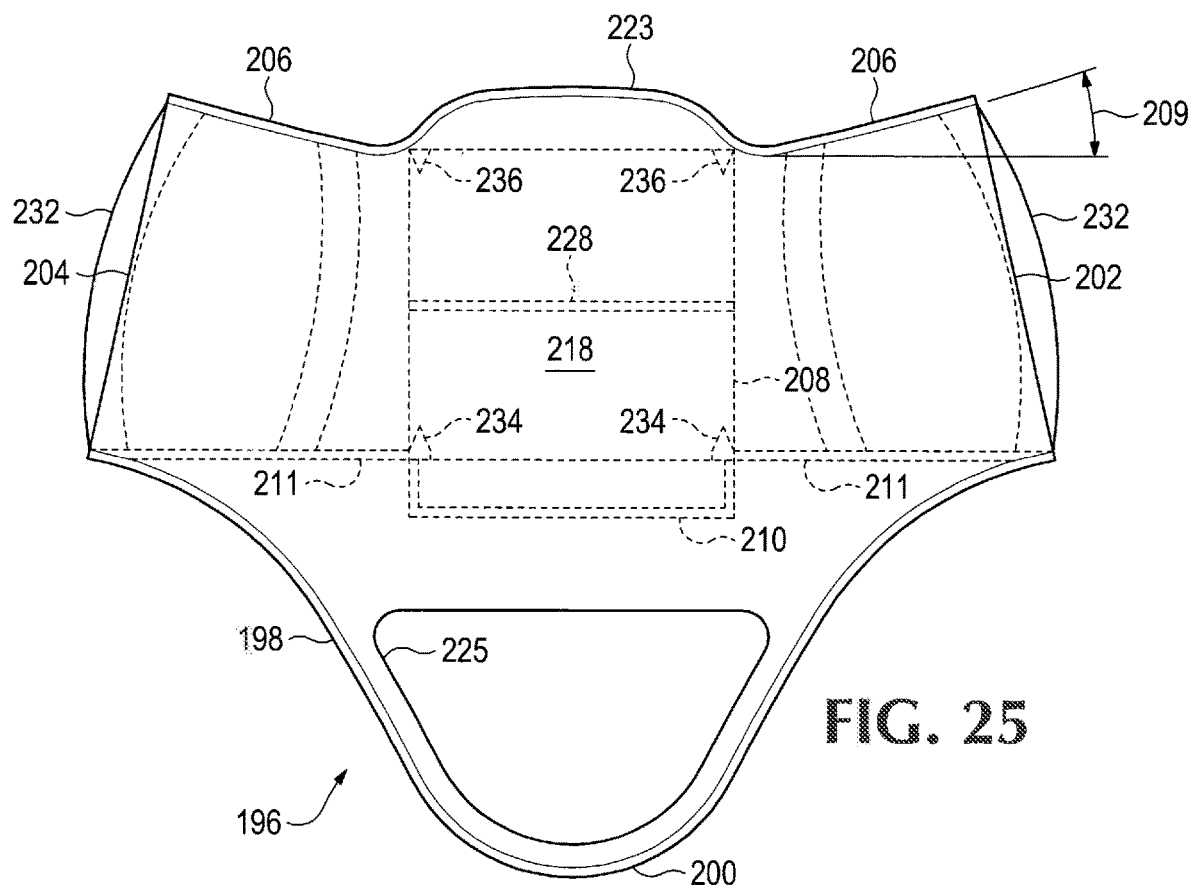
FIG. 25 is a bottom plan view of the ventilator shown in FIGS. 22-24.
Figure 26:
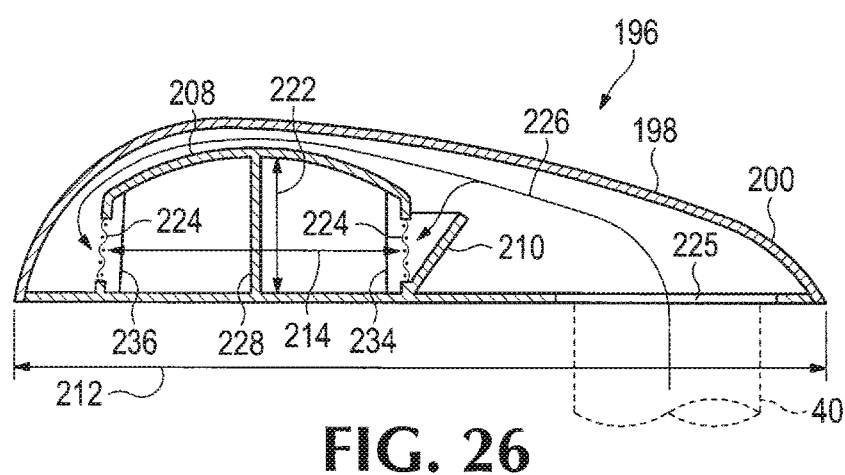
FIG. 26 is a sectional view taken along line 26-26 in FIG. 24.
Figure 27:
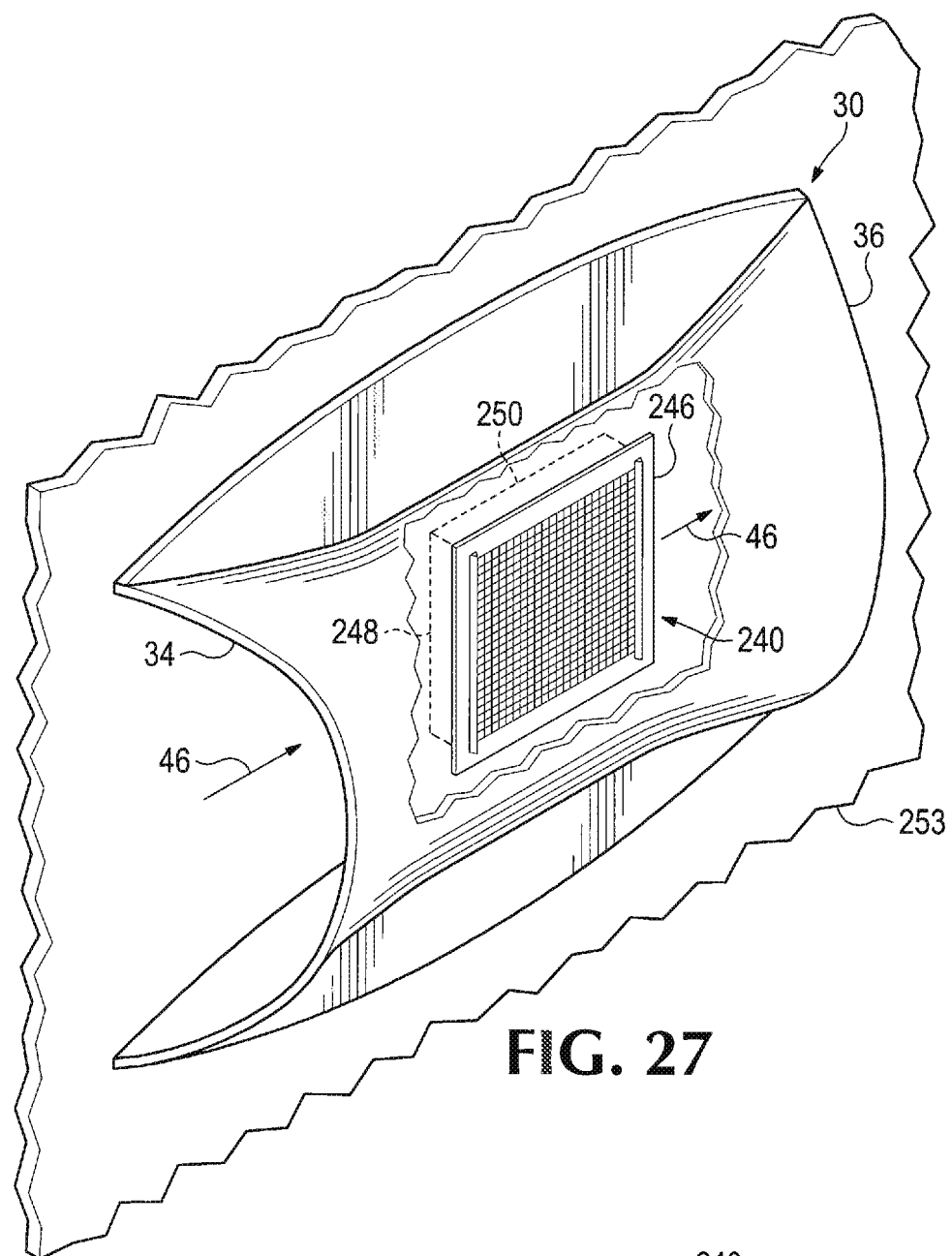
FIG. 27 is an isometric view showing a vent port mounted in a flat wall, with a ventilator such as the one shown in FIGS. 1-5 associated with the vent port.
Figure 28:
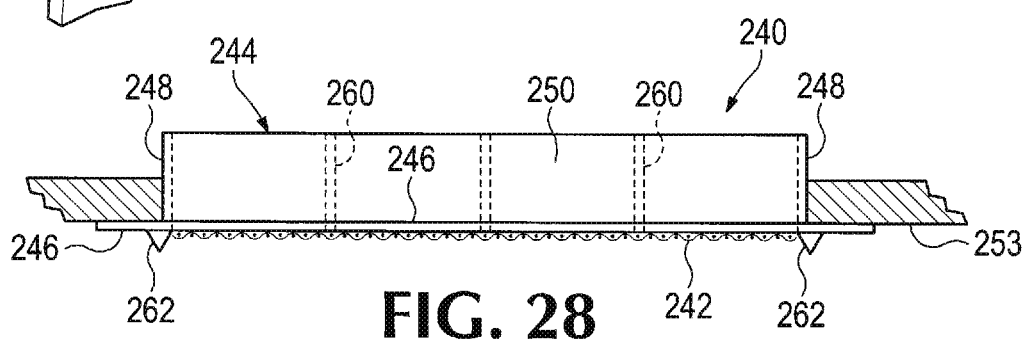
FIG. 28 is a top plan view of the vent port shown in FIG. 27.
Figures 29, 30:
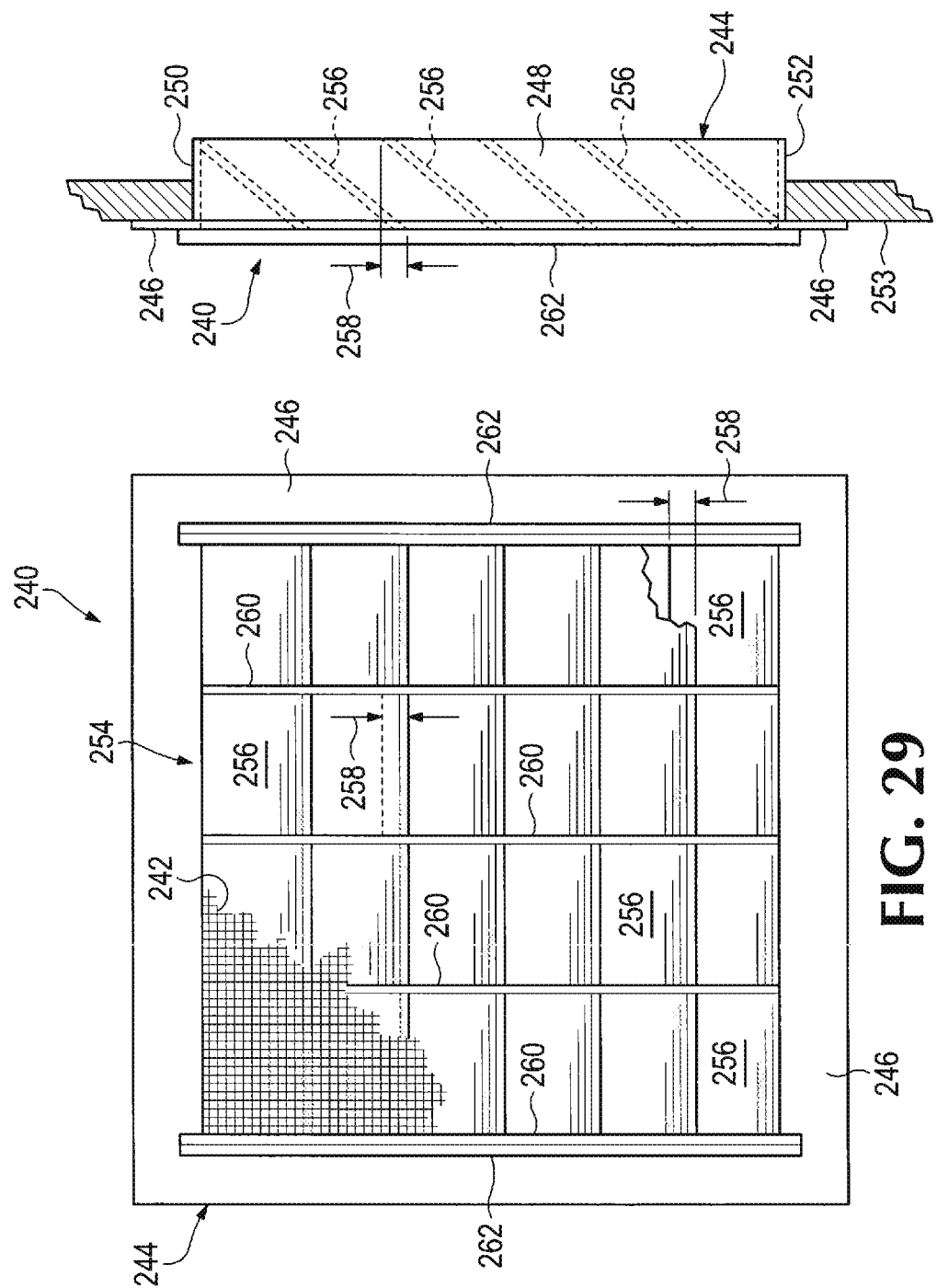
FIG. 29 is a front elevational view of the vent port shown in FIG. 27.
FIG. 30 is a right side elevational view of the vent port shown in FIGS. 27-29.

The oppositely facing open mouths 178 and 180 of the ventilator 154 are each connected by a respective tapered intermediate portion 182 or 184 to a nearer end of the throat portion 168, as may be seen in FIG. 18. Respective side extension portions 186 and 188 of the bulkhead 164 extend toward the mouths 178 and 180 and join with interior surfaces of the outer shell 156 and to define parts of the interior shape of the intermediate portions 182 and 184 of the ventilator 154. The opposite walls and the top of each intermediate portion 182 and 184 are oriented at an angle 185 to the sides and top of the throat portion 168 providing a tapered, expanding shape similar to that of the intermediate portions 56 of the ventilator 30. The top and sides of the throat portion 168 maintain a consistent shape and flow area, except that a pair of slender vertically oriented inwardly projecting strips 189 may be provided at each end of the throat portion 168 at the ends of the screen areas 170 and 172 as spoilers to smooth flow through the ventilator where flow from or toward the mouths 178 and 180 meets gas flowing in through the screen portions 170 and 172. A pair of guide slats 190 and 192 may be located in each of the mouths 178 and 180, extending parallel with each other and the base sheet 160. The guide slats are thin and oriented along the direction of the flow path 46 to help keep flow through the ventilator 154 smooth. They also help to prevent spray or rain from splashing over the bulkhead 164 into the vent opening 40.

Yet another ventilator 196, shown in FIGS. 22-26, is designed as a rooftop-mounted device generally similar to the ventilator 154, but is smaller in size and has a lower profile defined by its outer shell portion 198. A front portion 200 of the ventilator 196 may have a lower profile that of the ventilator 154 and may extend proportionally further forward beyond the open mouths 202 and 204, intermediate portions 206, and throat portion 208 of the ventilator 196 than in the ventilator 154 shown in FIGS. 16-21. As in the ventilators 30, 90, and 154, the mouths 202 and 204 define cross-sectional open areas greater than a cross-sectional area within the throat portion 168. The intermediate portions 206 are tapered inward from the mouths 202 and 204 toward the throat portion 168 and interior surfaces of the intermediate portions 206 may define an angle 209 in the range of 19° to 25° with respect to interior surfaces of the throat portion 168. A bulkhead 210 is provided, with side parts 211, similar to the bulkhead 164 in the ventilator shown in FIGS. 16-21 and described above, to oppose backflow through the throat portion into an exhaust port 40 or space to be exhausted by the ventilator. The ventilator 196 may have a length 212 as small as about 6 inches and still perform satisfactorily.

In such a smaller ventilator 196, as shown, for example, in FIGS. 22-26, the throat portion 208 may have a width 214 from front to back of about 3 inches and a width 216 of the ventilator 196, from mouth to mouth, measured along the base sheet 218, may be about 7 inches. The overall height 220 of the ventilator may be about two inches, while the interior height 222 of the throat may be 1.4 inches. A middle part 223 of the outer shell 198 extends rearward from the front portion 200, above and behind the throat portion 208 and down to the base sheet 218 on the far, or rear, side of the throat portion 208. Perforated areas or screens 224 are provided in the front and rear side-walls of the throat portion 208 and may have dimensions of about 3.5 inches by x1.125 inches on each of the front and rear sides of the throat portion 208 to permit flow of air through an opening 225 in the base sheet 218 from a vent port 40 beneath the ventilator 196 to enter the throat portion 208 through the perforated areas or screens 224 at either the front or the rear of the portion 208, as shown by the arrows 226 in FIG. 26. The interior surfaces of the intermediate portions 206 meet and are faired into the ends of the throat portion 208 to form a flow path 46 through the ventilator 196 similar to that of the ventilator 154.

As with the ventilator 154 just described, the ventilator 196 may include a central divider wall 228, guide slats 230 and 232, and spoiler strips 234 and 236 at the ends of the throat portion 208.

Referring next to FIGS. 27-30, it may be desirable to provide for exhaust of air or fumes from within a cargo container, within the body of a freight truck, or from within another enclosed structure that may be exposed to wind and weather. At the same time it may be desired to prevent any substantial amount of rain or other precipitation from being able to enter into the interior of the container or other structure. In order to permit such ventilation yet exclude rain and the like, a rectangular or square vent port 240 shown in FIGS. 27-30 may be provided in a wall or door 253 of the enclosed structure. The vent port 240 may include a front face 242 of perforated sheet material such as screen material, covering a frame 244 having outwardly extending coplanar flanges 246 on all of its sides. Respective side members 248, a top member 250, and a bottom member 252 extend rearwardly away from the front face and its flanges 246, so as to extend through an opening defined in a wall or door 253 of such a container or other enclosed structure. A grating 254 that may include a fixed louver arrangement of horizontally-extending slats 256 may be provided in the opening defined within the frame 244 of the vent port 240, with the slats 256 inclined so as to drain rain outwardly toward the front face 242 from within a structure in which the vent port 240 is mounted.

The inclined slats are 256 preferably spaced closely enough together above one another so that an upper margin of a lower slat slightly overlaps the height of the lower margin of a higher slat, as may be seen at 258. Thus, for example, slats each having a width of 1.5 inch and a thickness of 0.05 inch may be spaced upwardly apart from one another along the frame 244 by a distance of about 1 inch. The slats may be inclined with respect to the front face 242 at an angle of 45°, for example, leaving ample exhaust flow passages between adjacent slats.

Additionally, vertically-oriented divider slats 260 may be spaced apart from one another by similar distances. The vertically-oriented divider slats 260 may have widths that extend rearwardly, inwardly from the front face 242 of the vent port 240, thus leaving inclined rectangular or square exhaust flow passages to permit air to escape from within the container or other structure in which the vent port 240 is mounted. As may be seen in FIG. 27, the vent port 240 may be used, for example, in conjunction with a ventilator such as the ventilator 30 shown in FIGS. 1-5, oriented horizontally with its mouths 34 and 36 open to make use of wind blowing along a wall or door of the container in which the vent port is mounted. The vent port 240 may also be used with any of the ventilators shown in FIGS. 6-10, FIGS. 31-35, or FIGS. 36-41. A narrow ridge 262 may extend along each vertical side of the vent port 240, thus extending across and into the flow of air through the ventilator 30, as a spoiler to assist in allowing air to flow outward through the vent port 240 by discouraging air blowing along a flow path 46 through the ventilator 30 from being blown into the container through the vent port 240.

A vent port 270 similar to the vent port 240 is shown in FIG. 31, installed in conjunction with a ventilator 272 designed to fit within a channel 274, usually vertically oriented, defined by a corrugated sheet metal outer surface such as that of the cargo-carrying bodies of some trucks and some intermodal cargo containers, also shown in FIGS. 32-35. The vent port 270 may be generally similar to the vent port 240, but because of the shape of the channel where it is intended to be based, the vent port 270 may be elongated and relatively narrow. As shown in FIG. 32, its inclined louver slats 276 may be arranged to extend across the shorter dimension of the rectangular frame 278, while ridges 280 similar to the ridges 262 are provided at each narrow end of the vent port 270, extending transversely with respect to the direction 281 of air flow within the channel 274 and through the ventilator 272.

Figure 33:
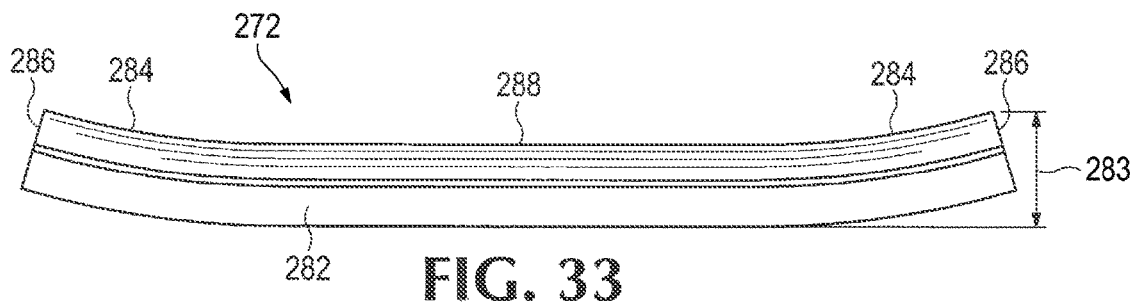
FIG. 33 is a side elevational view of the ventilator shown in FIGS. 31 and 32.
Figure 34:
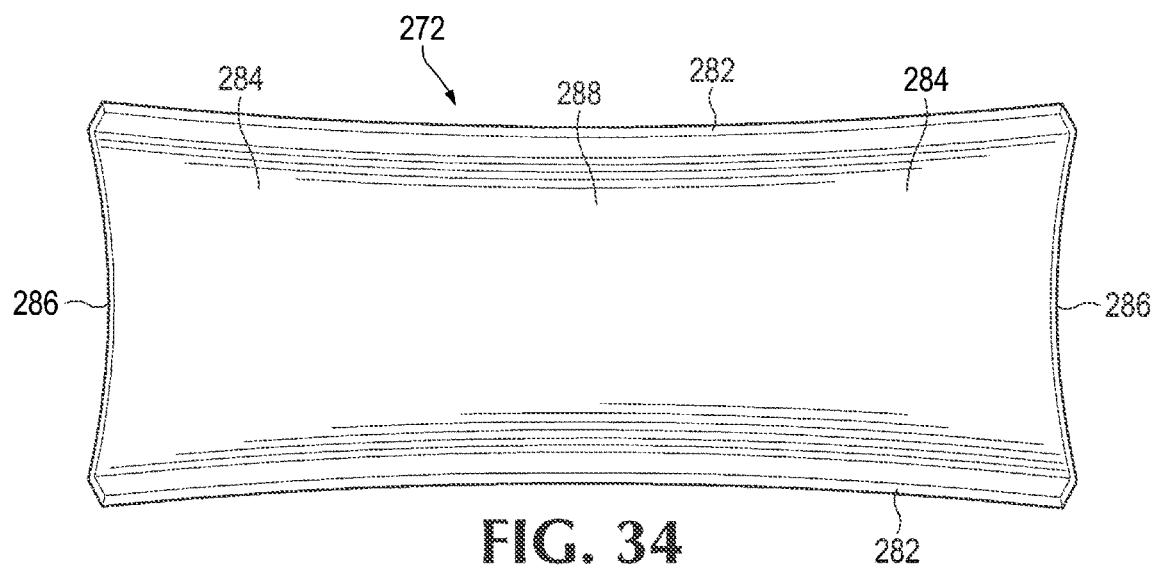
FIG. 34 is a top plan view of the ventilator shown in FIG. 33.
Figure 35:
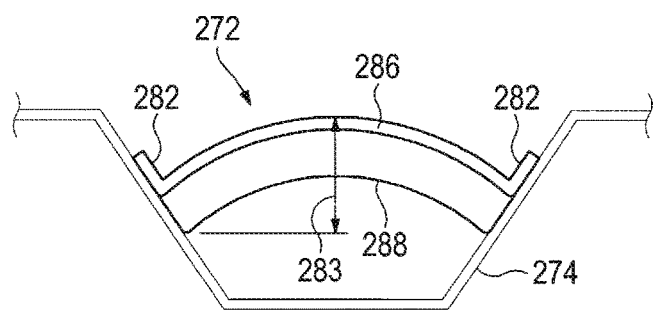
FIG. 35 is an end elevational view of the ventilator shown in FIGS. 33 and 34, shown mounted in a channel of a corrugated cargo container wall.

The ventilator 272 shown in FIGS. 31 and 33-35 is in most respects generally similar to the ventilator 30 shown in FIGS. 1-5, but its mounting flanges 282 along the outer sides are inclined so as to fit against the inclined faces of a channel 274 defined by the corrugated shape of an intermodal cargo container or a truck body. The ventilator 272 may have a height 283 that is small enough for the ventilator 272 to fit within the channel 274 without protruding above the profiles of the adjacent lands on opposite sides of the channel 274. As a result of the tapered shape of the intermediate portions 284 of the ventilator 272, leading from the respective mouth 286 at each end to the lower and narrower throat portion 288 in the middle of the length of the ventilator 272 the mounting flanges 282 are curved as seen in FIGS. 33 and 34. If a vent port 270, shown in FIG. 31, is used with the ventilator 272, the length of the throat portion 288 is at least as great as the length 290 along the channel 274 of the open front of the vent port 270. The throat portion 288, like the throat portion 45 of the ventilator 30, has a constant cross-sectional area along its length, while the mouths 286 are greater in area, and the intermediate portions 284 are tapered, gradually reducing in cross-sectional area proceeding from each mouth 286 to the nearer and of the throat portion 288.

Figure 36:
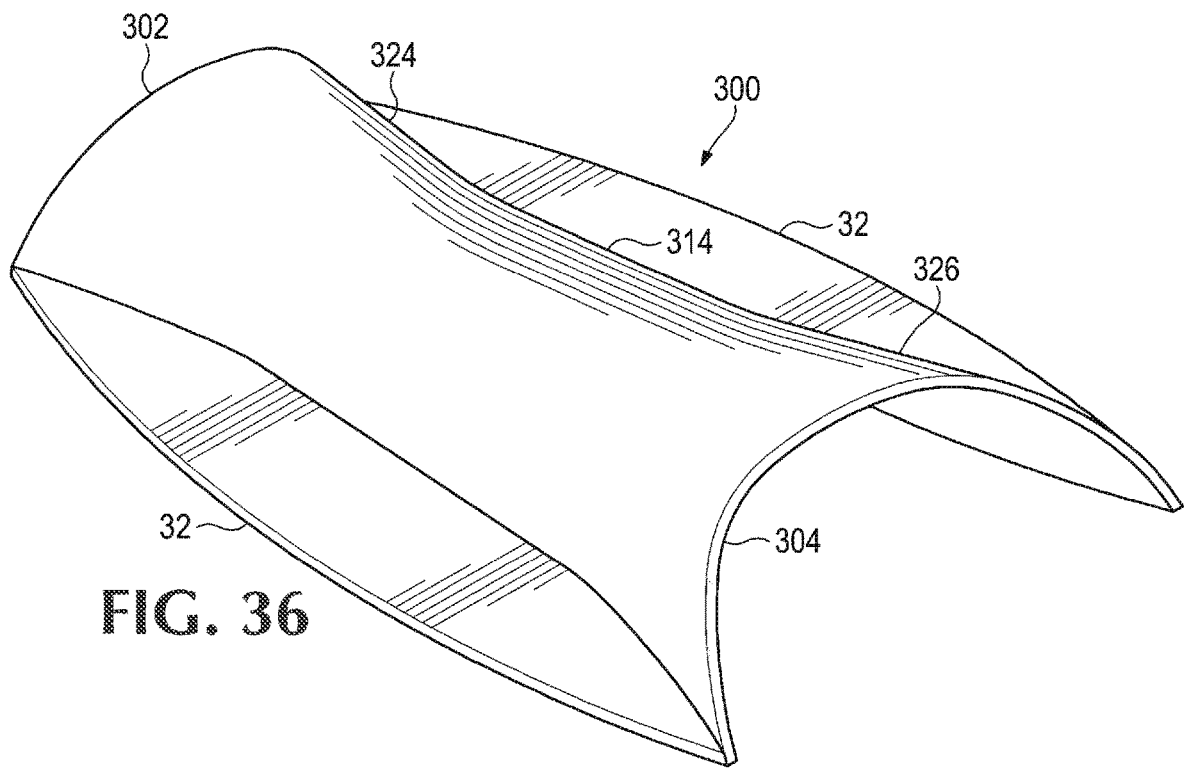
FIG. 36 is an isometric view showing a ventilator similar to that shown in FIGS. 1-5, but having a tapered configuration.
Figure 37:
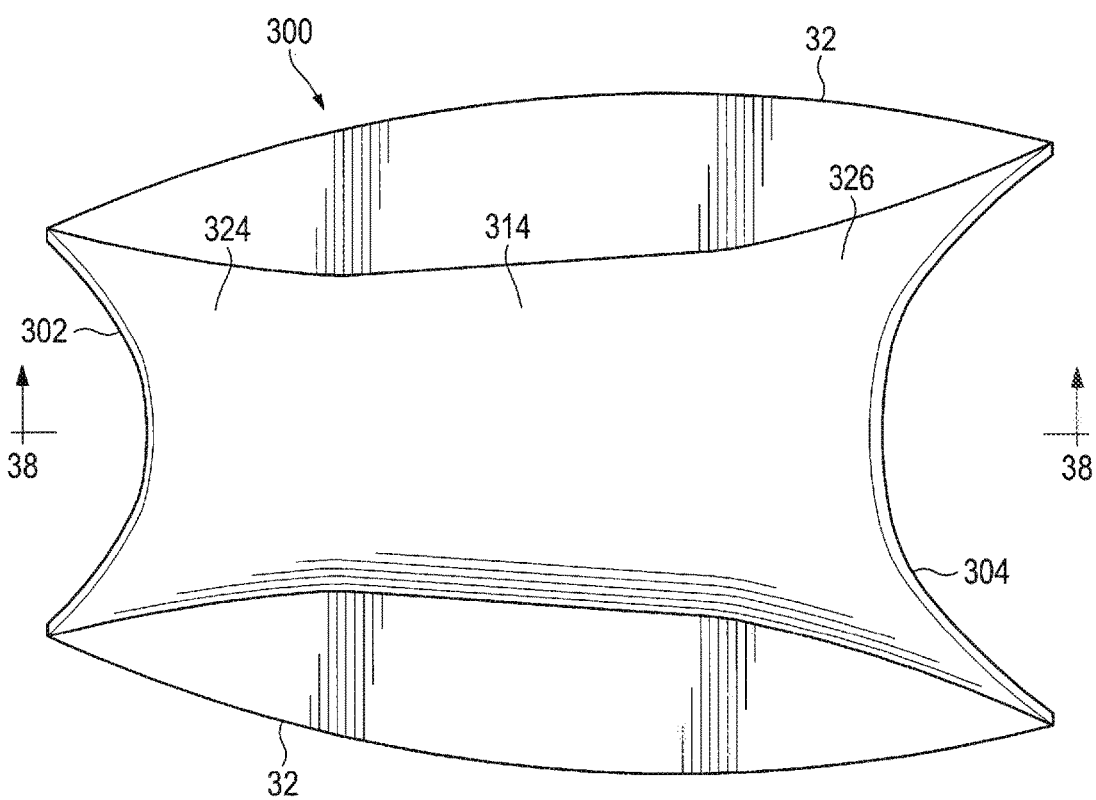
FIG. 37 is a top plan view of the ventilator shown in FIG. 36.

Referring next to FIGS. 36-41, an exhaust ventilator 300 is similar in most respects to the ventilator 30, except that its two mouths 302 and 304, while having equal cross-sectional areas, are of different shapes. The two mouths 302 and 304, at the opposite ends of the exhaust ventilator 300, have equal cross-sectional areas open for flow. The mouth 302, at the left end as seen in FIGS. 36-38 and 41, has a greater height 306 but a smaller width 308 than the height 310 and width 312 of the mouth 304 at the opposite end of the ventilator 300. That is, the mouth 304 at the right end of the ventilator 300 as seen in FIGS. 36 through 38 has a height 310 that is smaller than the height 306, but has a width 312 that is greater than the width 308 the mouth 302 at the left end, as best seen in FIGS. 38 and 41.

As a result, the angle 313 of the edges of the body with respect to the mounting surface at the mouth 302 is greater than the angle 315 of the edges of the body with respect to the mounting surface at the mouth 304. Additionally, it may be seen that the throat portion 314 of the exhaust vent shown in FIGS. 36 through 41 continuously changes from a higher, narrower, shape with a height 316 and a width 318 at the end of the throat portion 314 nearer to the mouth 302, to a lower, wider, shape with a height 320 and a width 322 at the end of the throat portion 314 nearer to the mouth 304, although the throat portion 314 has a constant cross-section area over its entire length, between the outwardly-tapered intermediate portions 324 and 326. The ventilator 300 has an overall length 328 and a minor length 330 in the range of at least about 30%-40% greater than the length 317 of the throat portion 314. The intermediate portions of the body, between each mouth 302 or 304 and the throat portion 314, are tapered, at an angle 332 to the adjacent surface of the throat portion 314 in the range of 19° to 25°.

The ventilator 300 shown in FIGS. 36 through 41 may be mounted on a surface surrounding a vent port, oriented in a desired direction, as where the predominant relative wind is from the end including the mouth 302, so that the expected direction of airflow is from the left to the right as shown in FIGS. 33-38. The desired orientation may be determined, instead, on the basis of other factors, including, to some extent, its appearance. For example, when the ventilator 300 is to be mounted where rain, spray, snow, dust, or other undesirable materials may be expected to be carried by the predominant wind it may be preferred to mount the exhaust ventilator 300 with its wider, lower, mouth 304 facing upward, to avoid a tendency for the undesirable materials to be blown into a mouth of the ventilator 304.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A ventilator, comprising:
(a) an elongate hollow body having a convexly-curved and smoothly-faired exterior surface and having a pair of opposite ends, the elongate hollow body defining a base plane, and the base plane and the elongate hollow body together defining an interior space;
(b) the elongate hollow body having a throat portion located centrally between the opposite ends of the elongate hollow body, the throat portion having a width, and the throat portion having a pair of opposite ends defining a length of the throat portion, and the throat portion including a portion of the interior space, the portion of the interior space included in the throat portion of the elongate hollow body having a throat cross-sectional area, between the opposite ends of the throat portion, with the shape and the throat cross-sectional area of the portion of the interior space in the throat portion being constant along all of the length of the throat portion, and with the base plane partially defining the portion of the interior space included in the throat portion, and the elongate hollow body being configured to be mounted on a generally flat surface with the base plane coincident with the generally flat surface and an exhaust opening being located within the throat portion;
(c) the elongate hollow body having a pair of respective open mouths, each of the open mouths defining a respective opening having an internal cross-sectional area that is greater than the throat cross-sectional area, each of the open mouths having a laterally central portion, and a minor length of the elongate hollow body being defined by the distance between the respective laterally central portions of the open mouths, the minor length being at least $_4$0% greater than the width of the throat portion;
(d) the elongate hollow body having a respective intermediate portion extending from each open mouth toward the throat portion, each intermediate portion being inwardly tapered and being interconnected with and merging smoothly with a respective one of the opposite ends of the throat portion, and the throat portion, a respective one of the intermediate portions, and a respective one of the open mouths together defining an exhaust flow path, extending from the portion of the interior space included within the throat portion, and thence through the respective one of the intermediate portions and outwardly through the open mouth; and
(e) wherein the elongate hollow body has a pair of laterally opposite side walls and a top portion interconnecting the side walls, the side walls extending longitudinally outwardly away from the throat portion and beyond the laterally central portions of the open mouths and defining an overall length of the elongate hollow body, the overall length of the elongate hollow body being at least 20% longer than the minor length.

2. The ventilator of claim 1 wherein the base plane of the elongate hollow body is open, so that the exhaust opening can communicate with the portion of the interior space included within the throat portion and partially defined by the base plane when the ventilator is mounted on the generally flat surface with the exhaust opening located within the throat portion.

3. The ventilator of claim 1 wherein the throat portion has a laterally central portion having a first internal height relative to the base plane, and wherein each mouth has a laterally central portion that has a second internal height relative to the base plane that is greater than the first internal height.

4. The ventilator of claim 1 wherein when the elongate hollow body is mounted on the generally flat surface with the throat portion surrounding the exhaust opening into the interior space within the throat portion, the throat portion is located in position to receive an exhaust flow through the exhaust opening and into the throat portion, and to direct the exhaust flow through the exhaust flow path.

5. The ventilator of claim 1 wherein the throat portion has a width, and wherein a laterally central portion of the throat portion has a first height relative to the base plane and a laterally central portion of each mouth has a second height relative to the base plane that is about one third greater than the first height.

6. The ventilator of claim 1 wherein each open mouth defines a respective opening having a respective cross-sectional area and wherein the respective cross-sectional areas of the open mouths are equal and the cross-sectional area of each of the open mouths is at least 1.5 times as great as the throat cross-sectional area.

7. The ventilator of claim 1 wherein the throat portion includes a planar side wail partially defining a width of the portion of the interior space included in the throat portion.

8. The ventilator of claim 1 wherein the opposite ends of the elongate hollow body are identical with each other.

9. The ventilator of claim 1 wherein the elongate hollow body is of sheet material having a concavely-curved and smoothly-faired interior surface that has a shape that conforms and corresponds to the exterior surface.

10. The ventilator of claim 1 wherein the elongate hollow body has a pair of laterally opposite side walls and a top portion extending between and interconnecting the side walls and spaced apart from the base plane, the top portion defining a minor length; and wherein each side wall of the elongate hollow body has a portion adjacent the base plane that is longer than the minor length of the top portion of the elongate hollow body; and wherein a margin of the portion of a side wall adjacent the base plane, defining a respective one of the mouths, is oriented at an acute angle to the base plane.

11. The ventilator of claim 10 wherein the acute angle is in the range of 25° to 65°.

12. The ventilator of claim 1 wherein the body includes a base flange extending outwardly from a side wall and configured to fit against a mounting surface, and wherein the base flange defines a plane that is coincident with the base plane.

13. The ventilator of claim 1 wherein an interior of the elongate hollow body is open toward the generally flat surface on which the elongate hollow body is configured to be mounted.

* * * * *